US010506020B2

(12) United States Patent
Jin et al.

(10) Patent No.: US 10,506,020 B2
(45) Date of Patent: Dec. 10, 2019

(54) DATA TRANSMISSION METHOD, AND TERMINAL

(71) Applicant: Huawei Technologies Co., Ltd., Shenzhen (CN)

(72) Inventors: Hui Jin, Beijing (CN); Songping Yao, Beijing (CN); Zhen Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 15/728,108

(22) Filed: Oct. 9, 2017

(65) Prior Publication Data
US 2018/0034894 A1 Feb. 1, 2018

Related U.S. Application Data

(63) Continuation of application No. PCT/CN2015/082681, filed on Jun. 29, 2015.

(30) Foreign Application Priority Data

Apr. 10, 2015 (WO) .............. PCT/CN2015/076284

(51) Int. Cl.
*H04L 29/08* (2006.01)
*H04W 76/10* (2018.01)
(Continued)

(52) U.S. Cl.
CPC .......... *H04L 67/06* (2013.01); *H04L 43/0876* (2013.01); *H04L 49/90* (2013.01);
(Continued)

(58) Field of Classification Search
CPC ..... H04L 43/0876; H04L 49/90; H04L 67/02; H04L 67/06; H04L 69/14; H04W 76/10; H04W 76/15; H04W 88/02; H04W 8/24
See application file for complete search history.

(56) References Cited

U.S. PATENT DOCUMENTS 8,516,147 B2 * 8/2013 Kaspar ................ H04W 76/15
709/236
2010/0017499 A1 1/2010 Martinent et al.
(Continued)

FOREIGN PATENT DOCUMENTS

CN 101287255 A 10/2008
CN 101389092 A 3/2009
(Continued)

OTHER PUBLICATIONS

Machine Translation and Abstract of Chinese Publication No. CN101287255, Oct. 15, 2008, 24 pages.
(Continued)

*Primary Examiner* — Joe Chacko
(74) *Attorney, Agent, or Firm* — Conley Rose, P.C.

(57) ABSTRACT

The present disclosure provides a data transmission method and a terminal. The method includes respectively allocating, by a terminal, a first download range and a second download range to a first network interface card and a second network interface card according to an obtained download range of to-be-downloaded data; and if the terminal determines that when a preset download time arrives, the first network interface card completes downloading of the first download range and the second network interface card does not complete downloading of the second download range, performing, by the terminal, a first allocation operation at least once. This reduces download duration of to-be-downloaded data.

18 Claims, 9 Drawing Sheets

(51) Int. Cl.
    *H04W 8/24*     (2009.01)
    *H04L 12/26*     (2006.01)
    *H04L 12/861*     (2013.01)
    *H04L 29/06*     (2006.01)
    *H04W 88/02*     (2009.01)
    *H04W 76/15*     (2018.01)

(52) U.S. Cl.
    CPC .............. *H04L 67/02* (2013.01); *H04L 69/14* (2013.01); *H04W 8/24* (2013.01); *H04W 76/10* (2018.02); *H04W 76/15* (2018.02); *H04W 88/02* (2013.01)

(56) References Cited

U.S. PATENT DOCUMENTS

| | | | |
|---|---|---|---|
| 2010/0057563 A1 | 3/2010 | Rauber et al. | |
| 2014/0323178 A1* | 10/2014 | Wei | H04W 76/16 455/552.1 |

FOREIGN PATENT DOCUMENTS

| | | | |
|---|---|---|---|
| CN | 101778491 A | 7/2010 | |
| CN | 101925051 A | 12/2010 | |
| CN | 103297451 A | 9/2013 | |
| CN | 104093142 A | 10/2014 | |
| CN | 104363580 A | 2/2015 | |
| JP | 2008304980 A | 12/2008 | |
| JP | 2011015190 A | 1/2011 | |
| JP | 2012501509 A | 1/2012 | |
| KR | 20140127744 A | 11/2014 | |
| KR | 20150022385 A | 3/2015 | |
| WO | 0237784 A2 | 5/2002 | |
| WO | 2007012662 A1 | 2/2007 | |
| WO | 2014175694 A1 | 10/2014 | |

OTHER PUBLICATIONS

Machine Translation and Abstract of Chinese Publication No. CN101389092, Mar. 18, 2009, 9 pages.
Machine Translation and Abstract of Chinese Publication No. CN101778491, Jul. 14, 2010, 13 pages.
Machine Translation and Abstract of Chinese Publication No. CN101925051, Dec. 22, 2010, 13 pages.
Machine Translation and Abstract of Chinese Publication No. CN103297451, Sep. 11, 2013, 20 pages.
Machine Translation and Abstract of Chinese Publication No. CN104093142, Oct. 8, 2014, 20 pages.
Machine Translation and Abstract of Chinese Publication No. CN104363580, Feb. 18, 2015, 20 pages.
Fielding, R., et al., "Hypertext Transfer Protocol—HTTP/1.1," RFC 2616, Jun. 1999, 114 pages.
Foreign Communication From a Counterpart Application, PCT Application No. PCT/CN2015/076284, International Search Report dated Dec. 29, 2015, 4 pages.
Foreign Communication From a Counterpart Application, PCT Application No. PCT/CN2015/082681, English Translation of International Search Report dated Jan. 7, 2016, 2 pages.
Foreign Communication From a Counterpart Application, PCT Application No. PCT/CN2015/082681, English Translation of Written Opinion dated Jan. 7, 2016, 6 pages.
Machine Translation and Abstract of Korean Publication No. KR20150022385, Mar. 4, 2015, 30 pages.
Machine Translation and Abstract of Japanese Publication No. JP2011015190, Jan. 20, 2011, 31 pages.
Foreign Communication From a Counterpart Application, Japanese Application No. 2017-552798, Japanese Office Action dated Dec. 4, 2018, 4 pages.
Foreign Communication From a Counterpart Application, Japanese Application No. 2017-552798, English Translation of Japanese Office Action dated Dec. 4, 2018, 4 pages.
Zhou X., et al., "A speed-based Adaptive Dynamic Parallel Downloading Technique," XP058298416, Operating Systems Review, ACM, vol. 39, No. 1, Jan. 1, 2005, 8 pages.
Foreign Communication From a Counterpart Application, European Application No. 15888261.3, Extended European Search Report dated Mar. 19, 2018, 9 pages.
Foreign Communication From a Counterpart Application, Japanese Application No. 10-2017-7031364, Korean Office Action dated Feb. 8, 2018, 8 pages.
Foreign Communication From a Counterpart Application, Japanese Application No. 10-2017-7031364, English Translation of Korean Office Action dated Feb. 8, 2018, 5 pages.
Machine Translation and Abstract of Japanese Publication No. JP2008304980, Dec. 18, 2008, 36 pages.
Foreign Communication From a Counterpart Application, Japanese Application No. 2017-552798, Japanese Office Action dated Apr. 23, 2019, 4 pages.
Foreign Communication From a Counterpart Application, Japanese Application No. 2017-552798, English Translation of Japanese Office Action dated Apr. 23, 2019, 4 pages.
Foreign Communication From A Counterpart Application, Korean Application No. 10-2017-7031364, Korean Office Action dated Feb. 8, 2018, 8 pages.
Foreign Communication From A Counterpart Application, Korean Application No. 10-2017-7031364, English Translation of Korean Office Action dated Feb. 8, 2018, 5 pages.

\* cited by examiner

DATA TRANSMISSION METHOD, AND TERMINAL

CROSS-REFERENCE TO RELATED APPLICATIONS

This application is a continuation of International Application No. PCT/CN2015/082681, filed on Jun. 29, 2015, which claims priority to International Application No. PCT/CN2015/076284, filed on Apr. 10, 2015. The disclosures of the aforementioned applications are hereby incorporated by reference in their entireties.

TECHNICAL FIELD

The present disclosure relates to communications technologies, and in particular, to a data transmission method and a terminal.

BACKGROUND

With continuous development of communications technologies, dual subscriber identity module terminals are becoming more popular in people's lives. However, currently most dual subscriber identity module terminals are single-pass terminals. That is, at a same moment, only one card can perform a data service. A network speed of a terminal is limited by a speed at which a single card obtains network data. This more or less causes troubles to a user when the user downloads a file by using the terminal.

To improve the foregoing situation, using a mobile phone as an example, in some approaches, the Hypertext Transfer Protocol (HTTP) 1.1 protocol that supports dual-pass downloading is used to download a file on a server side. That is, the HTTP 1.1 protocol is used, so that both cards of a dual subscriber identity module mobile phone can download files from a server at a same time. For example, when a terminal downloads a file from a server, the file may be divided into multiple parts, and then each part is transmitted on one physical link, so as to achieve an objective of concurrent downloading. For example, when the HTTP 1.1 protocol is used to download a file of 100 M, the first 50 M may be downloaded on a physical cell link 1, the last 50 M may be downloaded on a cell link 2, and the downloading is performed at the same time. In this way, an objective of accelerating downloading can be achieved.

However, during movement of a terminal, handover (for example, handover between a 3G network and a 4G network) occurs between networks of different standards. Because network speeds of the networks of different standards differ greatly, in this case, a download speed of a card may drop suddenly, resulting in a download timeout or a download failure of a file. That is, some approaches cannot ensure normal downloading of a file.

SUMMARY

Embodiments of the present disclosure provide a data transmission method and a terminal, so as to resolve a technical problem in some approaches that a download timeout or a download failure of a file is caused when a download speed of one network interface card of a terminal having two network interface cards drops suddenly.

According to a first aspect, an embodiment of the present disclosure provides a data transmission method, where the method is applicable to a terminal including a first network interface card and a second network interface card, and the method includes obtaining, by the terminal, a download range of to-be-downloaded data; respectively allocating, by the terminal, a first download range and a second download range to the first network interface card and the second network interface card according to the download range of the to-be-downloaded data; and if the terminal determines that when a preset download time arrives, the first network interface card completes downloading of the first download range and the second network interface card does not complete downloading of the second download range, performing, by the terminal, a first allocation operation at least once, until the first network interface card completes a new first download range, the second network interface card completes a new second download range, and the second download range is completely downloaded, where the first allocation operation includes respectively allocating the new first download range and the new second download range to the first network interface card and the second network interface card according to the second download range.

With reference to the first aspect, in a first possible implementation manner of the first aspect, the respectively allocating, by the terminal, a first download range and a second download range to the first network interface card and the second network interface card according to the download range of the to-be-downloaded data includes dividing, by the terminal, an entire download range of the to-be-downloaded data into the first download range and the second download range according to a network speed ratio between the first network interface card and the second network interface card, and respectively allocating the first download range and the second download range to the first network interface card and the second network interface card.

With reference to the first aspect, in a second possible implementation manner of the first aspect, the respectively allocating, by the terminal, a first download range and a second download range to the first network interface card and the second network interface card according to the download range of the to-be-downloaded data includes dividing, by the terminal, a partial download range of the to-be-downloaded data into the first download range and the second download range according to a preset allocation rule, and respectively allocating the first download range and the second download range to the first network interface card and the second network interface card; and the method subsequently further includes performing, by the terminal, a second allocation operation at least once, until the to-be-downloaded data is completely downloaded, where the second allocation operation includes respectively allocating, by the terminal, next-time data download ranges to the first network interface card and the second network interface card from a current remaining download range of the to-be-downloaded data.

With reference to any one of the first aspect to the second possible implementation manner of the first aspect, in a third possible implementation manner of the first aspect, the respectively allocating, by the terminal, the new first download range and the new second download range to the first network interface card and the second network interface card according to the second download range includes respectively allocating, by the terminal, the new first download range and the new second download range to the first network interface card and the second network interface card according to the preset allocation rule and from the second download range; or respectively allocating, by the terminal, the new first download range and the new second download range to the first network interface card and the second network interface card according to the preset allocation rule and from a remaining download range of the second download range.

With reference to the second possible implementation manner of the first aspect, in a fourth possible implementation manner of the first aspect, the respectively allocating, by the terminal, the new first download range and the new second download range to the first network interface card and the second network interface card according to the second download range includes allocating, by the terminal from a current remaining download range of the to-be-downloaded data, a next-time download range to the first network interface card that completes the first download range, and further determining whether the second network interface card completes, when a preset moment arrives, downloading of the second download range; and if not, after the first network interface card completes downloading of a current download range, respectively allocating, by the terminal, the new first download range and the new second download range to the first network interface card and the second network interface card according to the preset allocation rule and from a remaining download range of the second download range.

With reference to any one of the first aspect to the second possible implementation manner of the first aspect, in a fifth possible implementation manner of the first aspect, the respectively allocating, by the terminal, the new first download range and the new second download range to the first network interface card and the second network interface card according to the second download range includes determining, by the terminal according to a current network speed of the second network interface card, a first time that is needed by the second network interface card to download a remaining download range of the second download range; and when determining that the first time is longer than a first preset time, allocating, by the terminal, the new first download range and the new second download range to the first network interface card and the second network interface card according to the preset allocation rule and from the remaining download range of the second download range.

With reference to any one of the first aspect to the second possible implementation manner of the first aspect, in a sixth possible implementation manner of the first aspect, the respectively allocating, by the terminal, the new first download range and the new second download range to the first network interface card and the second network interface card according to the second download range includes determining, by the terminal according to a current network speed of the second network interface card, a first time that is needed by the second network interface card to download a remaining download range of the second download range; determining, by the terminal, according to a current network speed of the first network interface card and the current network speed of the second network interface card, a second time that is needed by the first network interface card and the second network interface card to jointly download the second download range; and when the first time is longer than the second time, respectively allocating, by the terminal, the new first download range and the new second download range to the first network interface card and the second network interface card according to the preset allocation rule and from the second download range.

With reference to any one of the first aspect to the sixth possible implementation manner of the first aspect, in a seventh possible implementation manner of the first aspect, before the method, the method further includes determining, by the terminal, timeliness of the to-be-downloaded data.

With reference to the seventh possible implementation manner of the first aspect, in an eighth possible implementation manner of the first aspect, the determining, by the terminal, timeliness of the to-be-downloaded data includes determining, by the terminal, a first application software (APP) that initiates a connection request for downloading the to-be-downloaded data; determining, by the terminal, whether the first APP matches an APP in a preset APP set; and if yes, determining, by the terminal, that the timeliness of the to-be-downloaded data is greater than a preset first threshold; otherwise, determining, by the terminal, that the timeliness of the to-be-downloaded data is less than the preset first threshold.

With reference to the seventh possible implementation manner of the first aspect, in a ninth possible implementation manner of the first aspect, the determining, by the terminal, timeliness of the to-be-downloaded data includes determining, by the terminal, a type of to-be-downloaded data carried in a HTTP GET request sent to a server; determining, by the terminal, whether the type of the to-be-downloaded data matches a type in a preset data type library; and if yes, determining, by the terminal, that the timeliness of the to-be-downloaded data is greater than a preset first threshold; otherwise, determining, by the terminal, that the timeliness of the to-be-downloaded data is less than the preset first threshold.

With reference to any one of the second possible implementation manner of the first aspect to the ninth possible implementation manner of the first aspect, in a tenth possible implementation manner of the first aspect, the preset allocation rule is a product of the current network speed of the first network interface card or the second network interface card and the preset download time.

According to a second aspect, an embodiment of the present disclosure provides a terminal, where the terminal is a terminal having a first network interface card and a second network interface card, and the terminal includes an obtaining module configured to obtain, by the terminal, a download range of to-be-downloaded data; a first allocation module configured to respectively allocate a first download range and a second download range to the first network interface card and the second network interface card according to the download range of the to-be-downloaded data; and a second allocation module configured to if it is determined that when a preset download time arrives, the first network interface card completes downloading of the first download range and the second network interface card does not complete downloading of the second download range, perform a first allocation operation at least once, until the first network interface card completes a new first download range, the second network interface card completes a new second download range, and the second download range is completely downloaded, where the first allocation operation includes respectively allocating the new first download range and the new second download range to the first network interface card and the second network interface card according to the second download range.

With reference to the second aspect, in a first possible implementation manner of the second aspect, the first allocation module is configured to divide an entire download range of the to-be-downloaded data into the first download range and the second download range according to a network speed ratio between the first network interface card and the second network interface card, and respectively allocate the first download range and the second download range to the first network interface card and the second network interface card.

With reference to the second aspect, in a second possible implementation manner of the second aspect, the first allocation module is configured to divide a partial download range of the to-be-downloaded data into the first download range and the second download range according to a preset allocation rule, and respectively allocate the first download range and the second download range to the first network interface card and the second network interface card; and the second allocation module is further configured to perform a second allocation operation at least once, until the to-be-downloaded data is completely downloaded, where the second allocation operation includes respectively allocating next-time data download ranges to the first network interface card and the second network interface card from a current remaining download range of the to-be-downloaded data.

With reference to any one of the second aspect to the second possible implementation manner of the second aspect, in a third possible implementation manner of the second aspect, the second allocation module is configured to according to the preset allocation rule, respectively allocate the new first download range and the new second download range to the first network interface card and the second network interface card from the second download range; or respectively allocate the new first download range and the new second download range to the first network interface card and the second network interface card from a remaining download range of the second download range.

With reference to the second possible implementation manner of the second aspect, in a fourth possible implementation manner of the second aspect, the second allocation module is configured to allocate, from a current remaining download range of the to-be-downloaded data, a next-time download range to the first network interface card that completes the first download range, and further determine whether the second network interface card completes, when a preset moment arrives, downloading of the second download range; and if not, after the first network interface card completes downloading of a current download range, respectively allocate the new first download range and the new second download range to the first network interface card and the second network interface card according to the preset allocation rule and from a remaining download range of the second download range.

With reference to any one of the second aspect to the second possible implementation manner of the second aspect, in a fifth possible implementation manner of the second aspect, the second allocation module is configured to determine, according to a current network speed of the second network interface card, a first time that is needed by the second network interface card to download a remaining download range of the second download range; and when it is determined that the first time is longer than a first preset time, respectively allocate the new first download range and the new second download range to the first network interface card and the second network interface card according to the preset allocation rule and from the remaining download range of the second download range.

With reference to any one of the second aspect to the second possible implementation manner of the second aspect, in a sixth possible implementation manner of the second aspect, the second allocation module is configured to determine, according to a current network speed of the second network interface card, a first time that is needed by the second network interface card to download a remaining download range of the second download range; determine, according to a current network speed of the first network interface card and the current network speed of the second network interface card, a second time that is needed by the first network interface card and the second network interface card to jointly download the second download range; and when it is determined that the first time is longer than the second time, respectively allocate the new first download range and the new second download range to the first network interface card and the second network interface card according to the preset allocation rule and from the second download range.

With reference to any one of the second aspect to the sixth possible implementation manner of the second aspect, in a seventh possible implementation manner of the second aspect, the terminal further includes a determining module configured to determine timeliness of the to-be-downloaded data.

With reference to the seventh possible implementation manner of the second aspect, in an eighth possible implementation manner of the second aspect, the determining module is configured to determine a first APP that initiates a connection request for downloading the to-be-downloaded data; determine whether the first APP matches an APP in a preset APP set; and if yes, determine that the timeliness of the to-be-downloaded data is greater than a preset first threshold; otherwise, determine that the timeliness of the to-be-downloaded data is less than the preset first threshold.

With reference to the seventh possible implementation manner of the second aspect, in a ninth possible implementation manner of the second aspect, the determining module is configured to determine a type of to-be-downloaded data carried in a HTTP GET request sent to a server; determine whether the type of the to-be-downloaded data matches a type in a preset data type library; and if yes, determine that the timeliness of the to-be-downloaded data is greater than a preset first threshold; otherwise, determine that the timeliness of the to-be-downloaded data is less than the preset first threshold.

With reference to any one of the second possible implementation manner of the second aspect to the ninth possible implementation manner of the second aspect, in a tenth possible implementation manner of the second aspect, the preset allocation rule is a product of the current network speed of the first network interface card or the second network interface card and the preset download time.

According to the data transmission method and the terminal provided in the embodiments of the present disclosure, the terminal determines a download range of to-be-downloaded data, respectively allocates a first download range and a second download range to a first network interface card and a second network interface card according to the download range of the to-be-downloaded data, and if the terminal determines that when a preset download time arrives, the first network interface card completes downloading of the first download range and the second network interface card does not complete downloading of the second download range, the terminal performs a first allocation operation at least once, until the first network interface card completes a new first download range, the second network interface card completes a new second download range, and the second download range is completely downloaded. According to the method provided in the embodiments of the present disclosure, when the second network interface card does not complete a download task on time, the first network interface card may share the download task with the second network interface card This avoids a case of an extremely long download time or a download failure because the second network interface card keeps downloading an allocated download task at a relatively low network speed. That is, the method provided in the embodiments of the present disclosure reduces download duration of the to-be-downloaded data, and improves download efficiency of a terminal, so that reliable downloading of data can be ensured.

According to a third aspect, an embodiment of the present disclosure provides a data transmission method, where the method is applicable to a terminal including a first network interface card and a second network interface card, and the method includes obtaining, by the terminal, a download range of to-be-downloaded data; respectively allocating, by the terminal, a first download range and a second download range to the first network interface card and the second network interface card according to the download range of the to-be-downloaded data; and if the second network interface card does not complete downloading of the second download range when the first network interface card completes downloading of the first download range, and a remaining download range of the second download range is greater than a first preset threshold, performing, by the terminal, a first allocation operation at least once, until the second download range is completely downloaded, where the first allocation operation includes respectively allocating a new first download range and a new second download range to the first network interface card and the second network interface card according to the remaining download range of the second download range.

According to a fourth aspect, an embodiment of the present disclosure provides a terminal, where the terminal is a terminal having a first network interface card and a second network interface card, and the terminal includes an obtaining module configured to obtain a download range of to-be-downloaded data; a first allocation module configured to respectively allocate a first download range and a second download range to the first network interface card and the second network interface card according to the download range of the to-be-downloaded data; and a second allocation module configured to if the second network interface card does not complete downloading of the second download range when the first network interface card completes downloading of the first download range, and a remaining download range of the second download range is greater than a first preset threshold, perform a first allocation operation at least once, until the second download range is completely downloaded, where the first allocation operation includes respectively allocating a new first download range and a new second download range to the first network interface card and the second network interface card according to the remaining download range of the second download range.

According to the data transmission method and the terminal provided in the embodiments of the present disclosure, the terminal respectively allocates a first download range and a second download range to a first network interface card and a second network interface card according to a download range of to-be-downloaded data, when a first network interface card completes a first download range but the second network interface card does not complete the second download range, the terminal may perform a first allocation operation, to allocate a part of a remaining download range of the second download range to the first network interface card, so that the first network interface card shares a download task with the second network interface card This avoids a case of an extremely long download time or a download failure because the second network interface card keeps downloading an allocated download task at a relatively low network speed. That is, download duration of to-be-downloaded data is reduced, and download efficiency of a terminal is improved, so that reliable downloading of data can be ensured.

BRIEF DESCRIPTION OF DRAWINGS

To describe the technical solutions in the embodiments of the present disclosure more clearly, the following briefly describes the accompanying drawings for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A terminal in the embodiments of the present disclosure may include, but is not limited to, a mobile communications device such as a mobile phone, a personal digital assistant (PDA), a tablet computer, or a portable device (for example, a portable computer) that includes a first network interface card and a second network interface card, or includes a device such as an automatic teller machine (ATM) that includes a first network interface card and a second network interface card, or a communications chip that supports a first network interface card and a second network interface card. A type of the terminal is not limited in the embodiments of the present disclosure. It should be noted that the foregoing first network interface card and second network interface card may be subscriber identity module (SIM) cards in a 2G network, or may be universal integrated circuit cards (UICC) in a 3G network, or may be network access modules in the terminal. For example, the foregoing first network interface card and second network interface card may be network access modules in a 4G network or a 3G network or a 2G network, or Wireless Fidelity (WiFi) network access modules, or the like.

An objective of a method in the embodiments of the present disclosure is to resolve a technical problem in some approaches that a download timeout or a download failure is caused when a network speed of one network interface card of a terminal having two network interface cards drops suddenly. In addition, the method can further resolve a technical problem in some approaches of delayed downloading of data because a download manner cannot be adjusted in a timely manner based on timeliness of to-be-downloaded data.

Several embodiments are used below to describe the technical solutions of the present disclosure in detail. The following several embodiments may be combined with each other, and a same or similar concept or process may not be described repeatedly in some embodiments.

Figure 1:
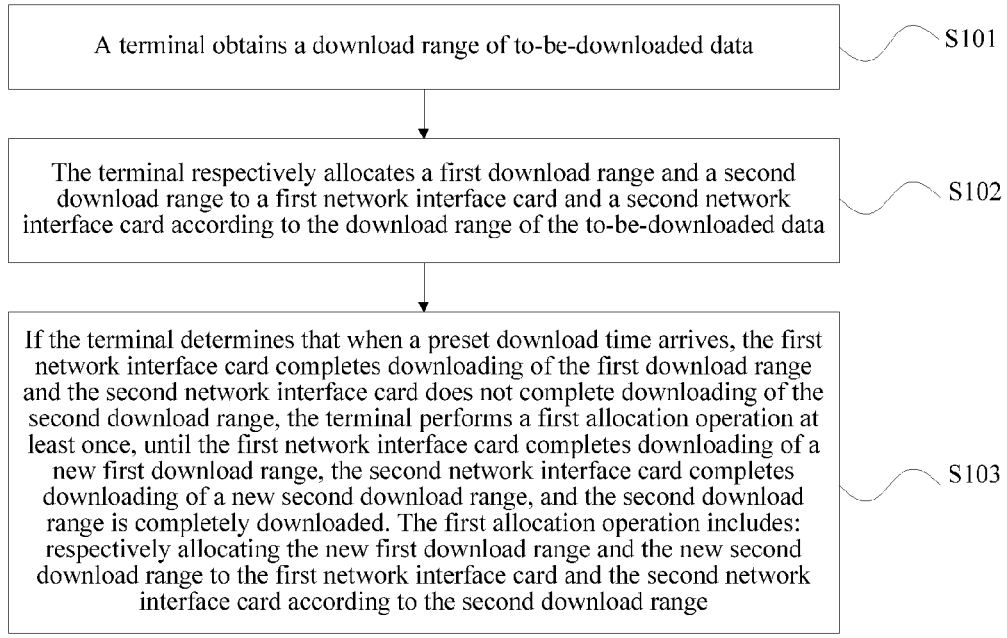
FIG. 1 is a schematic flowchart of Embodiment 1 of a data transmission method according to an embodiment of the present disclosure.

FIG. 1 is a schematic flowchart of Embodiment 1 of a data transmission method according to an embodiment of the present disclosure. The method in this embodiment is a process in which an allocation manner of to-be-downloaded data is adjusted, so that a first network interface card and a second network interface card can download the to-be-downloaded data in a timely manner, and this reduces a download time. As shown in FIG. 1, the method includes the following steps.

S101. A terminal obtains a download range of to-be-downloaded data.

APP on the terminal may initiates, to the terminal, a request for downloading or obtaining network data, or a user may click a link on a web page, so that the terminal learns a request of the user for obtaining network data. Therefore, the terminal may send a HTTP GET request to a server on a network side, to obtain a download range of to-be-downloaded data. The download range of the to-be-downloaded data may include a size of the to-be-downloaded data, or a byte start location of the to-be-downloaded data and a byte end location of to-be-downloaded data.

S102. The terminal respectively allocates a first download range and a second download range to the first network interface card and the second network interface card according to the download range of the to-be-downloaded data.

The first download range and the second download range herein are respectively a byte start location and a byte end location of data that needs to be downloaded and that is allocated by the terminal to the first network interface card and the second network interface card.

After learning the download range of the to-be-downloaded data, the terminal respectively allocates corresponding download ranges to the first network interface card and the second network interface card according to the download range of the to-be-downloaded data. Optionally, the terminal may preset a download time, and allocate corresponding download ranges to the first network interface card and the second network interface card according to the download time and the download range of the to-be-downloaded data. Optionally, the terminal may further respectively allocate a first download range and a second download range to the first network interface card and the second network interface card by using the preset download time and according to a current network speed of the first network interface card and a current network speed of the second network interface card. For example, it is assumed that the download range of the to-be-downloaded data is 0 M to 100 M, network speeds of the first network interface card and the second network interface card are both 1 M/s, and the terminal allocates a download amount (that is, bits of 1 M) whose download time is 1 s to each of the first network interface card and the second network interface card. That is, the first download range allocated by the terminal to the first network interface card is (0 M to 1 M), the second download range allocated to a second network interface card is (1 M to 2 M). The foregoing download time preset by the terminal may be a value dynamically generated by the terminal according to the download range of the to-be-downloaded data. In other words, settings of the download time change with a change in the allocation manner of the download range of the to-be-downloaded data. For example, it is assumed that the terminal divides a to-be-downloaded range into a first download range and a second download range (how to allocate the download range of the to-be-downloaded data is not limited in this embodiment of the present disclosure), and allocates the first download range and the second download range to the first network interface card and the second network interface card correspondingly. In this case, a download time preset by the terminal is relatively long. It is assumed that the terminal divides a partial download range obtained from the download range of the to-be-downloaded data into a first download range and a second download range. In this case, a download time preset by the terminal is shorter than the download time in the allocation manner described above.

In this embodiment, an allocation manner or an allocation principle of how the terminal initially allocates corresponding download ranges to the first network interface card and the second network interface card is not limited.

S103. If the terminal determines that when a preset download time arrives, the first network interface card completes downloading of the first download range and the second network interface card does not complete downloading of the second download range, the terminal performs a first allocation operation at least once, until the first network interface card completes downloading of a new first download range, the second network interface card completes downloading of a new second download range, and the second download range is completely downloaded. The first allocation operation includes respectively allocating the new first download range and the new second download range to the first network interface card and the second network interface card according to the second download range.

In a download process, the terminal may be in a state of movement. That is, the terminal may be handed over between networks of different standards. Therefore, an unstable network speed of a network interface card or a sudden drop in a network speed of a network interface card is easily caused. In this embodiment, it is assumed that a network speed of the first network interface card is stable, and a network speed of the second network interface card suddenly drops because the terminal is handed over between networks of different standards. Therefore, the second download range allocated by the terminal to the second network interface card cannot be completed on time when the preset download time (for example, is in the foregoing example) arrives.

Therefore, when the terminal determines that when the preset download time arrives, the first network interface card completes downloading of the first download range and the second network interface card does not complete downloading of the second download range, the terminal performs a first allocation operation at least once, until the first network interface card completes downloading of a new first download range, the second network interface card completes downloading of a new second download range, and the second download range is completely downloaded. The first allocation operation includes respectively allocating the new first download range and the new second download range to the first network interface card and the second network interface card according to the second download range. In this embodiment, the first allocation operation may be dividing, by the terminal, the second download range into two parts, that is, dividing the second download range into two parts, a new first download range and a new second download range, and respectively allocating the two parts to the first network interface card and the second network interface card. Alternatively, the first allocation operation may be, taking a partial download range from the second download range, dividing the partial download range into two parts, a new first download range and a new second download range, and respectively allocating the two parts to the first network interface card and the second network interface card. Alternatively, the first allocation operation may be dividing a download range (that is, a remaining download range of the second download range) that is not completely downloaded by the second network interface card into two parts, that is, dividing a download range that is not completely downloaded by the second network interface card into two parts, a new first download range and a new second download range, and respectively allocating the two parts to the first network interface card and the second network interface card. Alternatively, the first allocation operation may be taking a partial download range from a download range that is not completely downloaded by the second network interface card, dividing the partial download range into two parts, a new first download range and a new second download range, and respectively allocating the two parts to the first network interface card and the second network interface card. In other words, the foregoing first allocation operation is sharing of the download range of the second network interface card by the first network interface card when the second network interface card does not complete downloading of the second download range.

That is, if the terminal determines that when the preset download time arrives, the first network interface card completes the downloading of the foregoing first download range and the second network interface card does not complete the downloading of the foregoing second download range, the terminal respectively allocates a new first download range and a new second download range to the first network interface card and the second network interface card according to the foregoing second download range. Subsequently, the first network interface card performs an operation of downloading the new first download range, and the second network interface card performs an operation of downloading the new second download range (it should be noted that when allocating new download ranges to the two network interface cards, the terminal also presets a new download time). Duration of the new download time and the foregoing preset download time may be equal, or may not be equal. In this embodiment, for ease of description, it may be assumed that the new preset download time is equal to the foregoing preset download time). The terminal continues to determine whether the two network interface cards both complete downloading of corresponding new download ranges when the new download time arrives. If the two network interface cards both complete the downloading of the corresponding new download ranges when the new download time arrives, the terminal determines whether the foregoing second download range initially allocated to the second network interface card is completely downloaded at this time. If yes, it indicates that the first network interface card and the second network interface card both complete downloading of the initially allocated download ranges. If not, it indicates that the second download range initially allocated to the second network interface card is still not completely downloaded. The terminal continues to respectively allocates, from a remaining download range of the second download range except the new first download range and the new second download range, another new first download range and another new second download range to the first network interface card and the second network interface card again, and repeats the foregoing process, until the first network interface card completes downloading of a currently allocated new first download range, the second network interface card completes downloading of a current new second download range, and the second download range is completely downloaded.

Optionally, if the terminal determines that when the new download time arrives, the first network interface card completes the downloading of the new first download range, and the second network interface card still does not complete the downloading of the new second download range, the terminal continues to respectively allocate, from the new second download range, another new first download range and another new second download range again to the first network interface card that completes the foregoing new first download range and the second network interface card that does not complete the foregoing new second download range, until the new second download range of the second network interface card is completely downloaded. Then the terminal continues to determine whether the second download range initially allocated by the terminal to the second network interface card is completely downloaded.

To better understand the foregoing first allocation operation, a simple example may be used for description herein. It is assumed that the download range of the to-be-downloaded data is 0 M to 100 M, network speeds of the first network interface card and the second network interface card are both 1 M/s, and the terminal allocates a download amount whose download time is 1 s to each of the first network interface card and the second network interface card. That is, the first download range allocated by the terminal to the first network interface card is (0 M to 1 M), the second download range allocated to a second network interface card is (1 M to 2 M). Normally, both network interface cards can complete downloading when 1 s arrives. However, because the second network interface card is handed over from a 4G network to a 3G network, and a network speed changes to 0.1 M Byte/s, the second network interface card does not complete downloading of the second download range when 1 s arrives. Therefore, the terminal performs the first allocation operation. That is, in this case, the terminal terminates downloading by the second network interface card (the second network interface card currently downloads only 0.1 M). Optionally, the terminal reallocates the remaining download range (1.1 M to 2 M) of the second network interface card to the first network interface card and the second network interface card. Assuming that a new download time preset by the terminal is also 1 s, a new second download range that can be allocated by the terminal to the second network interface card is (1.1 M to 1.2 M), and a new first download range that can be allocated to the first network interface card is (1.2 M to 2 M). Finally, the terminal determines whether the new first download range and the new second download range are both completely downloaded when the preset download time (1 s) arrives. It is assumed that when the preset download time (1 s) arrives, the first network interface card completes downloading of the new first download range (1.2 M to 2 M), and the second network interface card still does not complete downloading of the new second download range (1.1 M to 1.2 M) but completes downloading of only (1.1 M to 1.15 M). Therefore, the terminal continues to perform the foregoing first allocation operation, to reallocate the remaining (1.15 M to 1.2 M) of the second network interface card to the two network interface cards. It is assumed that a new second download range allocated by the terminal to the second network interface card again is (1.15 M to 1.18 M), and a new first download range allocated to the first network interface card is (1.18 M to 2 M). Finally, the terminal determines whether the new first download range and the new second download range are both completely downloaded when the preset download time arrives, and determines whether to perform the foregoing first allocation operation again according to a determining result, until the first network interface card completes downloading of a current new first download range, the second network interface card completes downloading of a current new second download range, and the second download range initially allocated by the terminal to the second network interface card is completely downloaded.

That is, in this embodiment of the present disclosure, the terminal can use the first network interface card to share a download task with the second network interface card when the download task cannot be completed on time because a network speed of the second network interface card drops suddenly. This avoids a case of an extremely long download time or a download failure because the second network interface card keeps downloading an allocated download task at a relatively low network speed.

According to the data transmission method provided in this embodiment of the present disclosure, a terminal determines a download range of to-be-downloaded data, respectively allocates a first download range and a second download range to a first network interface card and a second network interface card according to the download range of the to-be-downloaded data, and if the terminal determines that when a preset download time arrives, the first network interface card completes downloading of the first download range and the second network interface card does not complete downloading of the second download range, the terminal performs a first allocation operation at least once, until the first network interface card completes a new first download range, the second network interface card completes a new second download range, and the second download range is completely downloaded. According to the method provided in this embodiment of the present disclosure, when the second network interface card does not complete a download task on time, the first network interface card may share the download task with the second network interface card. This avoids a case of an extremely long download time or a download failure because the second network interface card keeps downloading an allocated download task at a relatively low network speed. That is, the method provided in this embodiment of the present disclosure reduces download duration of the to-be-downloaded data, and improves download efficiency of a terminal, so that reliable downloading of data can be ensured.

Figure 2:
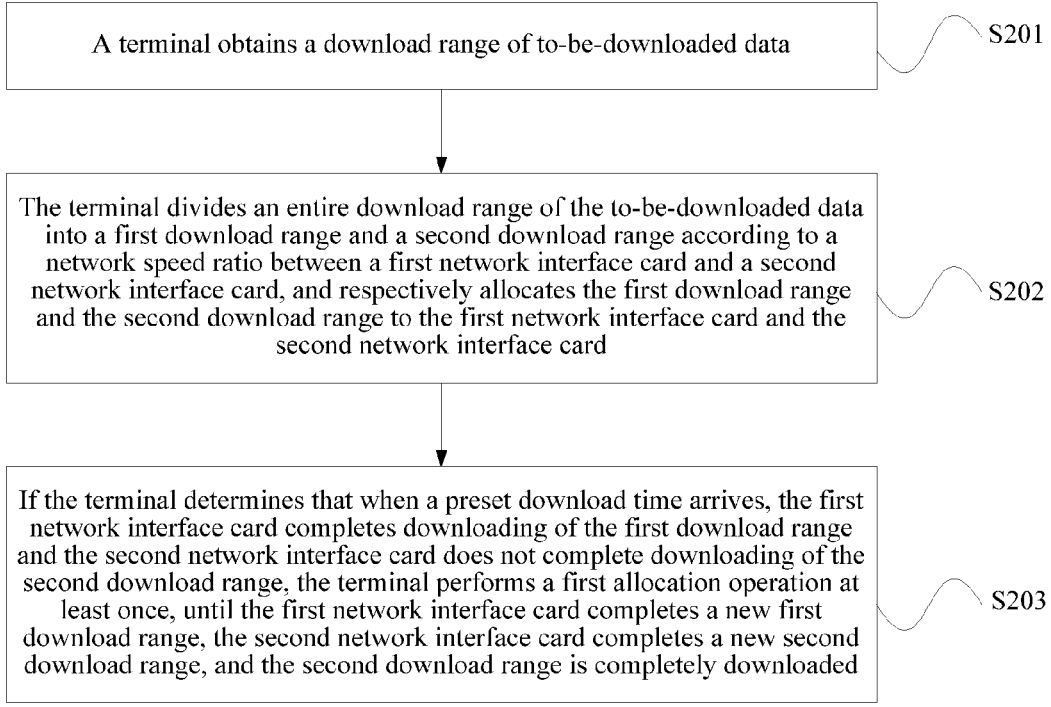
FIG. 2 is a schematic flowchart of Embodiment 2 of a data transmission method according to an embodiment of the present disclosure.

FIG. 2 is a schematic flowchart of Embodiment 2 of a data transmission method according to an embodiment of the present disclosure. Based on the foregoing embodiment, this embodiment includes a process in which a terminal respectively allocates a first download range and a second download range to a first network interface card and a second network interface card according to a download range of to-be-downloaded data, and a process in which if the terminal determines that when a preset download time arrives, the first network interface card completes downloading of the first download range and the second network interface card does not complete downloading of the second download range, the terminal performs a first allocation operation. As shown in FIG. 2, the method includes the following steps.

S201. The terminal obtains the download range of the to-be-downloaded data.

For a performing process of S201, refer to the description of S101. Details are not described herein again.

S202. The terminal divides an entire download range of the to-be-downloaded data into the first download range and the second download range according to a network speed ratio between the first network interface card and the second network interface card, and respectively allocates the first download range and the second download range to the first network interface card and the second network interface card.

The terminal learns a current network speed of the first network interface card and a current network speed of the second network interface card, and determines a network speed ratio between the first network interface card and the second network interface card according to the current network speed of the first network interface card and the current network speed of the second network interface card. Subsequently, the terminal divides the entire download range of the to-be-downloaded data into the first download range and the second download range (that is, a total amount of the first download range and the second download range is equal to the foregoing download range of the to-be-downloaded data) according to the network speed ratio, and respectively allocates the first download range and the second download range to the first network interface card and the second network interface card.

S203. If the terminal determines that when a preset download time arrives, the first network interface card completes downloading of the first download range and the second network interface card does not complete downloading of the second download range, the terminal performs a first allocation operation at least once, until the first network interface card completes a new first download range, the second network interface card completes a new second download range, and the second download range is completely downloaded.

In a download process, the terminal may be in a state of movement. That is, the terminal may be handed over between networks of different standards. Therefore, an unstable network speed of a network interface card or a sudden drop in a network speed of a network interface card is easily caused. In this embodiment, it is assumed that a network speed of the first network interface card is stable, and a network speed of the second network interface card suddenly drops because the terminal is handed over between networks of different standards. Therefore, the second download range allocated by the terminal to the second network interface card cannot be completed on time when the preset download time (for example, 1 s in the example in the foregoing Embodiment 1) arrives.

Therefore, when the terminal determines that when the preset download time arrives, the first network interface card completes downloading of the first download range and the second network interface card does not complete downloading of the second download range, the terminal performs a first allocation operation at least once, to respectively allocate a new first download range and a new second download range to the first network interface card and the second network interface card, until the first network interface card completes downloading of the new first download range, the second network interface card completes downloading of the new second download range, and the second download range is completely downloaded.

For the performing, by the terminal, the first allocation operation, to respectively allocate a new first download range and a new second download range to the first network interface card and the second network interface card, there may be four implementation manners.

In a first implementation manner, the terminal respectively allocates the new first download range and the new second download range to the first network interface card and the second network interface card according to a preset allocation rule and from the second download range.

Optionally, in this embodiment, the preset allocation rule may be a product of the current network speed of the first network interface card and the foregoing preset download time, or may be a product of the current network speed of the second network interface card and the foregoing preset download time.

Optionally, the respectively allocating, by the terminal, the new first download range and the new second download range to the first network interface card and the second network interface card from the foregoing second download range may be dividing, by the terminal, the second download range into two parts, that is, dividing the second download range into two parts, the new first download range and the new second download range, and respectively allocating the two parts to the first network interface card and the second network interface card. In such an allocation manner, the terminal determines again whether the two network interface cards both complete downloading when the preset download time arrives, and when one of the two network interface cards does not complete downloading, the terminal continues to perform the foregoing first allocation operation. In other words, the terminal continuously reallocates, to the two network interface cards, a download range that is not completely downloaded and that is in a network interface card, until the first download range and the second download range that are respectively allocated by the terminal to the first network interface card and the second network interface card are both completely downloaded.

Optionally, the respectively allocating, by the terminal, the new first download range and the new second download range to the first network interface card and the second network interface card from the second download range may further be taking, by the terminal, a partial download range from the second download range, dividing the partial download range into two parts, a new first download range and a new second download range, and respectively allocating the two parts to the first network interface card and the second network interface card. The terminal determines again whether the two network interface cards both complete downloading of the new download ranges when the preset download time arrives, and when one of the two network interface cards does not complete downloading, the terminal continues to perform the foregoing first allocation operation, until the corresponding new download ranges in the two network interface cards are both completely downloaded. Subsequently, the terminal continues to perform the first allocation operation again on a remaining download range of the second download range except the new first download range and the new second download range, until the foregoing second download range initially allocated by the terminal to the second network interface card is completely downloaded.

In a second implementation manner, the terminal respectively allocates the new first download range and the new second download range to the first network interface card and the second network interface card according to a preset allocation rule and from a remaining download range of the second download range.

Optionally, the respectively allocating, by the terminal, the new first download range and the new second download range to the first network interface card and the second network interface card from the foregoing remaining download range of the second download range may be dividing, by the terminal, the remaining download range of the second download range into two parts, that is, dividing the remaining download range of the second download range into two parts, the new first download range and the new second download range, and respectively allocating the two parts to the first network interface card and the second network interface card. In such an allocation manner, the terminal determines again whether the two network interface cards both complete downloading when the preset download time arrives, and when one of the two network interface cards does not complete downloading, the terminal continues to perform the foregoing first allocation operation. In other words, the terminal continuously reallocates, to the two network interface cards, a download range that is not completely downloaded and that is in a network interface card, until the first download range and the second download range that are respectively allocated by the terminal to the first network interface card and the second network interface card are both completely downloaded.

Optionally, the respectively allocating, by the terminal, the new first download range and the new second download range to the first network interface card and the second network interface card from the foregoing remaining download range of the second download range may further be taking, by the terminal, a partial download range from the remaining download range of the second download range, dividing the partial download range into two parts, a new first download range and a new second download range, and respectively allocating the two parts to the first network interface card and the second network interface card. The terminal determines again whether the two network interface cards both complete downloading of the new download ranges when the preset download time arrives, and when one of the two network interface cards does not complete downloading, the terminal continues to perform the foregoing first allocation operation, until the corresponding new download ranges in the two network interface cards are both completely downloaded. Subsequently, the terminal continues to perform the first allocation operation on a remaining download range of the remaining download range of the second download range except the new first download range and the new second download range, until the foregoing remaining download range of the second download range is completely downloaded.

Figure 3:
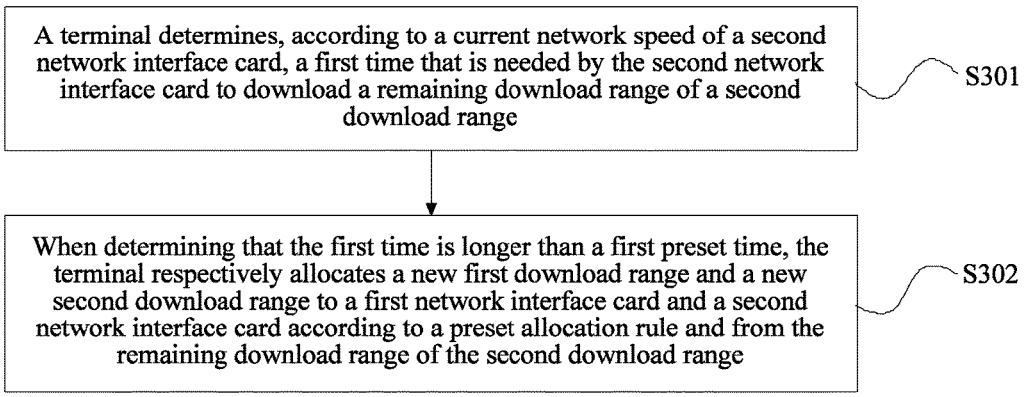
FIG. 3 is a schematic flowchart of Embodiment 3 of a data transmission method according to an embodiment of the present disclosure.

In a third implementation manner, referring to Embodiment 3 shown in FIG. 3, the method includes the following steps.

S301. The terminal determines, according to a current network speed of the second network interface card, a first time that is needed by the second network interface card to download a remaining download range of the second download range.

A mobile phone determines a remaining download range of the second download range according to a downloaded range of the second download range, and then determines, according to a current network speed of the second network interface card, a first time that is needed by the second network interface card to download the remaining download range of the second download range.

S302. When determining that the first time is longer than a first preset time, the terminal respectively allocates the new first download range and the new second download range to the first network interface card and the second network interface card according to a preset allocation rule and from the remaining download range of the second download range.

Optionally, the first preset time may be maximum waiting duration in which a user waits for downloading and that is preset by the terminal. For S302 in which the terminal "respectively allocates the new first download range and the new second download range to the first network interface card and the second network interface card according to a preset allocation rule and from the remaining download range of the second download range", refer to a process of the second implementation manner in this embodiment. Details are not described herein again.

Optionally, if the terminal determines that the first time is shorter than the first preset time, the terminal determines that the second network interface card continues to download a current remaining download range of the second download range.

Figure 4:
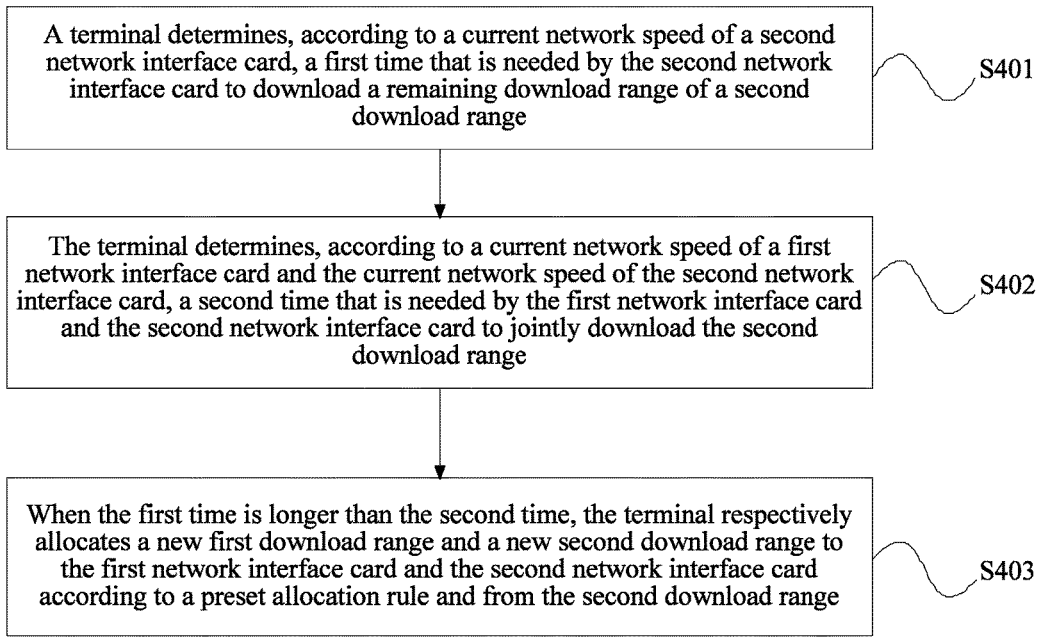
FIG. 4 is a schematic flowchart of Embodiment 4 of a data transmission method according to an embodiment of the present disclosure.

In a fourth implementation manner, referring to Embodiment 4 shown in FIG. 4, the method includes the following steps.

S401. The terminal determines, according to a current network speed of the second network interface card, a first time that is needed by the second network interface card to download a remaining download range of the second download range.

A mobile phone determines a remaining download range of the second download range according to a downloaded range of the second download range, and then determines, according to a current network speed of the second network interface card, a first time that is needed by the second network interface card to download the remaining download range of the second download range.

S402. The terminal determines, according to a current network speed of the first network interface card and the current network speed of the second network interface card, a second time that is needed by the first network interface card and the second network interface card to jointly download the second download range.

The terminal may determine, by using a formula, (the second download range)/(the current network speed of the first network interface card+the current network speed of the second network interface card), the second time that is needed by the first network interface card and the second network interface card to jointly download the second download range.

S403. When the first time is longer than the second time, the terminal respectively allocates the new first download range and the new second download range to the first network interface card and the second network interface card according to the preset allocation rule and from the second download range.

When the foregoing first time is longer than the second time, it indicates that a time taken by the second network interface card to continue to download a remaining download range of the second download range that is not completely downloaded by the second network interface card is longer than a time needed by the first network interface card and the second network interface card to simultaneously download the second download range. Therefore, the terminal chooses to cause the first network interface card and the second network interface card to simultaneously download the second download range, that is, the terminal respectively allocates the new first download range and the new second download range to the first network interface card and the second network interface card according to the foregoing preset allocation rule from the second download range. This reduces a time taken by the terminal to download the second download range. It should be noted that for S403 in which the terminal "respectively allocates the new first download range and the new second download range to the first network interface card and the second network interface card according to the preset allocation rule and from the second download range", refer to a process of the first implementation manner in this embodiment. Details are not described herein again.

Optionally, when the foregoing first time is shorter than the second time, it indicates that a time taken by the second network interface card to continue to download a remaining download range of the second download range that is not completely downloaded by the second network interface card is shorter than a time needed by the first network interface card and the second network interface card to simultaneously download the second download range. Therefore, the terminal instructs the second network interface card to continue to download the remaining download range of the second download range, and does not need to perform reallocation.

To sum up, regardless of which manner described above is used by the terminal to respectively allocate new download ranges to the first network interface card and the second network interface card, because the foregoing download range of the to-be-downloaded data is divided into two parts, a first download range and a second download range, when the first download range and the second download range that are allocated by the terminal to the first network interface card and the second network interface card are both completely downloaded, it indicates that the to-be-downloaded data obtained by the terminal from a network side is completely downloaded.

According to the method provided in this embodiment of the present disclosure, a terminal dynamically allocates download ranges to a first network interface card and a second network interface card respectively, so that when the second network interface card does not complete a download task on time, the first network interface card may share the download task with the second network interface card. This avoids a case of an extremely long download time or a download failure because the second network interface card keeps downloading an allocated download task at a relatively low network speed. That is, the method provided in this embodiment of the present disclosure reduces download duration of to-be-downloaded data, and improves download efficiency of a terminal, so that reliable downloading of data can be ensured.

Figure 5:
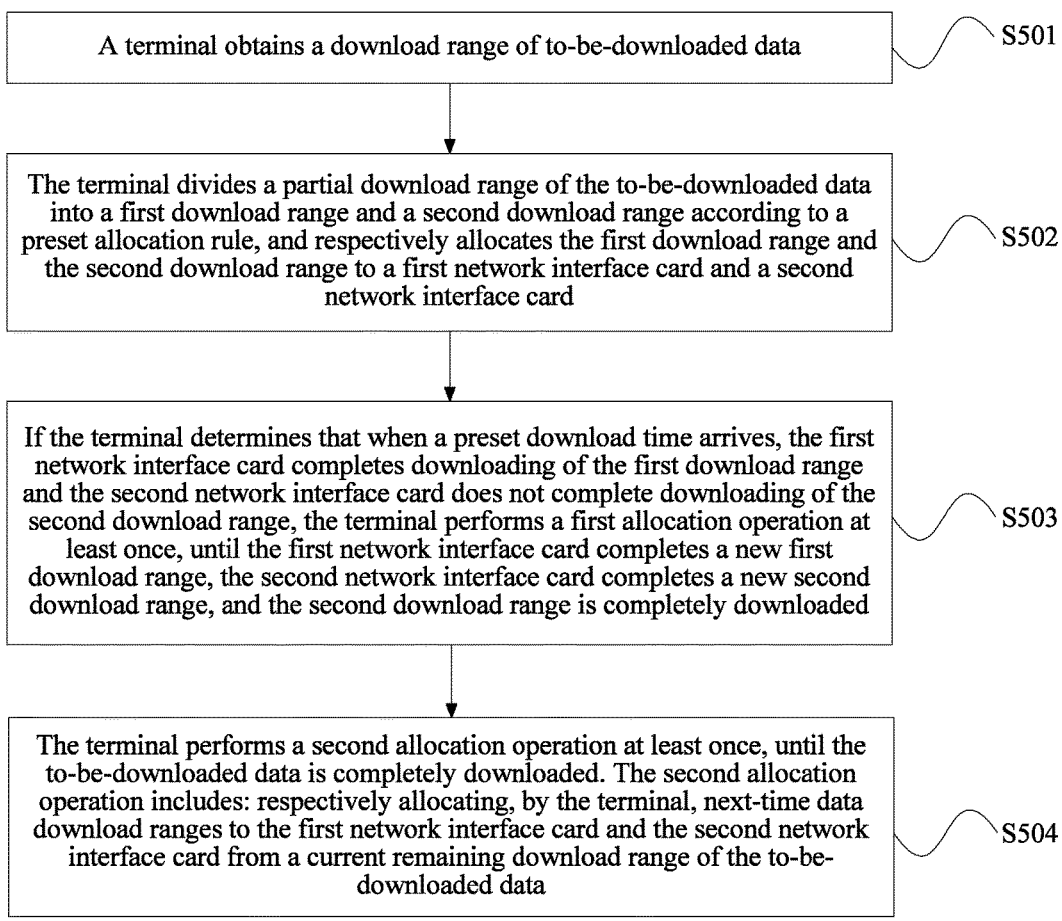
FIG. 5 is a schematic flowchart of Embodiment 5 of a data transmission method according to an embodiment of the present disclosure.

FIG. 5 is a schematic flowchart of Embodiment 5 of a data transmission method according to an embodiment of the present disclosure. Based on the foregoing Embodiment 1, this embodiment includes another process in which a terminal respectively allocates a first download range and a second download range to a first network interface card and a second network interface card according to a download range of to-be-downloaded data, and a process in which if the terminal determines that when a preset download time arrives, the first network interface card completes downloading of the first download range and the second network interface card does not complete downloading of the second download range, the terminal performs a first allocation operation. As shown in FIG. 5, the method includes the following steps.

S501. The terminal obtains the download range of the to-be-downloaded data.

For a performing process of S501, refer to the description of S101. Details are not described herein again.

S502. The terminal divides a partial download range of the to-be-downloaded data into the first download range and the second download range according to a preset allocation rule, and respectively allocates the first download range and the second download range to the first network interface card and the second network interface card.

Optionally, in this embodiment, the preset allocation rule may be a product of the current network speed of the first network interface card and the foregoing preset download time, or may be a product of the current network speed of the second network interface card and the foregoing preset download time.

S503. If the terminal determines that when a preset download time arrives, the first network interface card completes downloading of the first download range and the second network interface card does not complete downloading of the second download range, the terminal performs a first allocation operation at least once, until the first network interface card completes a new first download range, the second network interface card completes a new second download range, and the second download range is completely downloaded.

For a process of S503, refer to the description process of S203 in the foregoing Embodiment 2. Details are not described herein again.

S504. The terminal performs a second allocation operation at least once, until the to-be-downloaded data is completely downloaded. The second allocation operation includes respectively allocating, by the terminal, next-time data download ranges to the first network interface card and the second network interface card from a current remaining download range of the to-be-downloaded data.

After the terminal determines that the first network interface card completes the new first download range, the second network interface card completes the new second download range, and the foregoing second download range is completely downloaded, it indicates that the first download range and the second download range that are previously respectively allocated to the first network interface card and the second network interface card from the partial download range of the to-be-downloaded data are both completely downloaded. Therefore, the terminal performs the second allocation operation, that is, the terminal further respectively allocates next-time data download ranges to the first network interface card and the second network interface card again from a current remaining download range of the to-be-downloaded data except the foregoing first download range and second download range, and performs a download process with reference to the solution of S503 described above, until the foregoing download range of the to-be-downloaded data is completely downloaded. That is, after the terminal respectively allocates the next-time data download ranges to the first network interface card and the second network interface card again from the current remaining download range of the to-be-downloaded data, the terminal continues to determine whether the corresponding download ranges in the two network interface cards are completely downloaded when the preset download time arrives, and when one of the two network interface cards does not complete downloading, the terminal still performs the foregoing first allocation operation. In other words, the terminal continuously reallocates, to the two network interface cards, a download range that is not completely downloaded and that is in a network interface card, until the corresponding download ranges in the two network interface cards are both completely downloaded.

It should be noted that when the terminal performs the second allocation operation at least twice, that is, when the first network interface card completely downloads a current download range of the first network interface card and the second network interface card completely downloads a current download range of the second network interface card, but the to-be-downloaded data is not completely downloaded, the terminal performs the foregoing second allocation operation again. Therefore, the terminal performs the second allocation operation each time based on a current remaining download range of to-be-downloaded data after previous allocation.

According to the method provided in this embodiment of the present disclosure, a terminal dynamically allocates download ranges to a first network interface card and a second network interface card respectively, so that when the second network interface card does not complete a download task on time, the first network interface card may share the download task with the second network interface card. This avoids a case of an extremely long download time or a download failure because the second network interface card keeps downloading an allocated download task at a relatively low network speed. That is, the method provided in this embodiment of the present disclosure reduces download duration of to-be-downloaded data, and improves download efficiency of a terminal, so that reliable downloading of data can be ensured.

Based on the foregoing Embodiment 3, this embodiment includes another process in which the terminal respectively allocates the new first download range and the new second download range to the first network interface card and the second network interface card according to the second download range. Further, the foregoing first allocation operation includes allocating, by the terminal, from a current remaining download range of the to-be-downloaded data, a next-time download range to the first network interface card that completes the first download range, and further determining whether the second network interface card completes, when a preset moment arrives, downloading of the second download range; and if not, after the first network interface card completes downloading of a current download range, respectively allocating, by the terminal, the new first download range and the new second download range to the first network interface card and the second network interface card according to a preset allocation rule and from a remaining download range of the second download range.

Because a network speed of the second network interface card drops suddenly, when the terminal determines that when the preset download time arrives, the first network interface card completes downloading of the first download range and the second network interface card does not complete downloading of the second download range, the terminal allocates a next-time download range to the first network interface card, which currently completes the first download range, from the current remaining download range of the foregoing to-be-downloaded data (a remaining download range of the to-be-downloaded data is a remaining part other than the first download range and the second download range). Meanwhile, the terminal instructs the second network interface card to continue to download the remaining download range of the second download range that is not completely downloaded, and determines whether the second network interface card completes, when the foregoing preset moment arrives, the downloading of the foregoing second download range. Optionally, the terminal may set the foregoing preset moment according to a timing period of a preset timer.

When the terminal determines that the second network interface card still does not complete, when a preset moment arrives, the downloading of the foregoing second download range, the terminal terminates downloading by the second network interface card, and allocates a new second download range to the second network interface card according to a preset allocation rule. In addition, after the first network interface card completely downloads a current download range (the current download range of the first network interface card is allocated by the foregoing terminal to the first network interface card from the remaining download range of the to-be-downloaded data), the terminal allocates a new first download range to the first network interface card from the current remaining download range of the foregoing second download range (that is, a part of the remaining download range of the foregoing second download range except the new second download range that is allocated to the second network interface card), and so on, until the remaining download range of the second download range is completely downloaded.

To better describe this process, a simple example is used for description in this embodiment.

It is assumed that initial network speeds of the first network interface card and the second network interface card are both 1 M/s. The terminal respectively allocates one-second download ranges to the first network interface card and the second network interface card from a determined download range of to-be-downloaded data. That is, the first download range allocated by the terminal to the first network interface card is (0 M to 1 M), and the second download range allocated by the terminal to the second network interface card is (1 M to 2 M). In addition, the terminal specifies that the preset moment is 2.5 s.

It is assumed that the network speed of the second network interface card drops suddenly (for example, drops to 0.1 M/s) in a download process. When one second elapses, the second network interface card does not complete the downloading of the second download range, and the first network interface card completes the downloading of the first download range. Therefore, in this case, the terminal continues to allocate a next-second download range (2 M to 3 M) to the first network interface card, and the second network interface card continues to download the foregoing second download range that is not completed.

It is assumed that after the 2 second elapses, the first network interface card again completes a current download range, and the second network interface card still does not complete downloading of the foregoing second download range. The terminal continues to allocate a next-time download range to the first network interface card, that is, allocate a next-second download range (3 M to 4 M), and the second network interface card continues to download the foregoing second download range that is not completed.

When the time reaches 2.5 seconds, the terminal determines that the time is up for the second network interface card, terminates downloading by the second network interface card, stores the downloaded range (1 M to 1.25 M) of the second network interface card in a downloaded range of the terminal, and allocates a new second download range (1.25 M to 1.35 M) to the second network interface card according to a current network speed of the second network interface card and the foregoing preset download time (which is still assumed to be 1 s). In addition, after the third second elapses, the first network interface card completes a current download range (that is, completes downloading of 3 M to 4 M). The terminal determines that there is still a remaining part (1.35 M to 2 M) in the remaining download range of the foregoing second download range, and the terminal allocates the remaining part to the first network interface card, until the second network interface card completes downloading of the new second download range, and the first network interface card completes downloading of the new first download range.

Optionally, if speeds of the foregoing first network interface card and second network interface card both drop suddenly in a download process, the terminal may pause downloading by the second network interface card, use two network interface cards to simultaneously download a current download task of the first network interface card, and after the download task of the first network interface card is completed, use the two network interface cards to simultaneously download a current download task of the second network interface card. Such a method can also reduce a time taken by the terminal to download the to-be-downloaded data.

According to the method provided in this embodiment of the present disclosure, a terminal dynamically allocates download ranges to a first network interface card and a second network interface card respectively, so that when the second network interface card does not complete a download task on time, the first network interface card may share the download task with the second network interface card. This avoids a case of an extremely long download time or a download failure because the second network interface card keeps downloading an allocated download task at a relatively low network speed. That is, the method provided in this embodiment of the present disclosure reduces download duration of the to-be-downloaded data, and improves download efficiency of a terminal, so that reliable downloading of data can be ensured.

Figure 6:
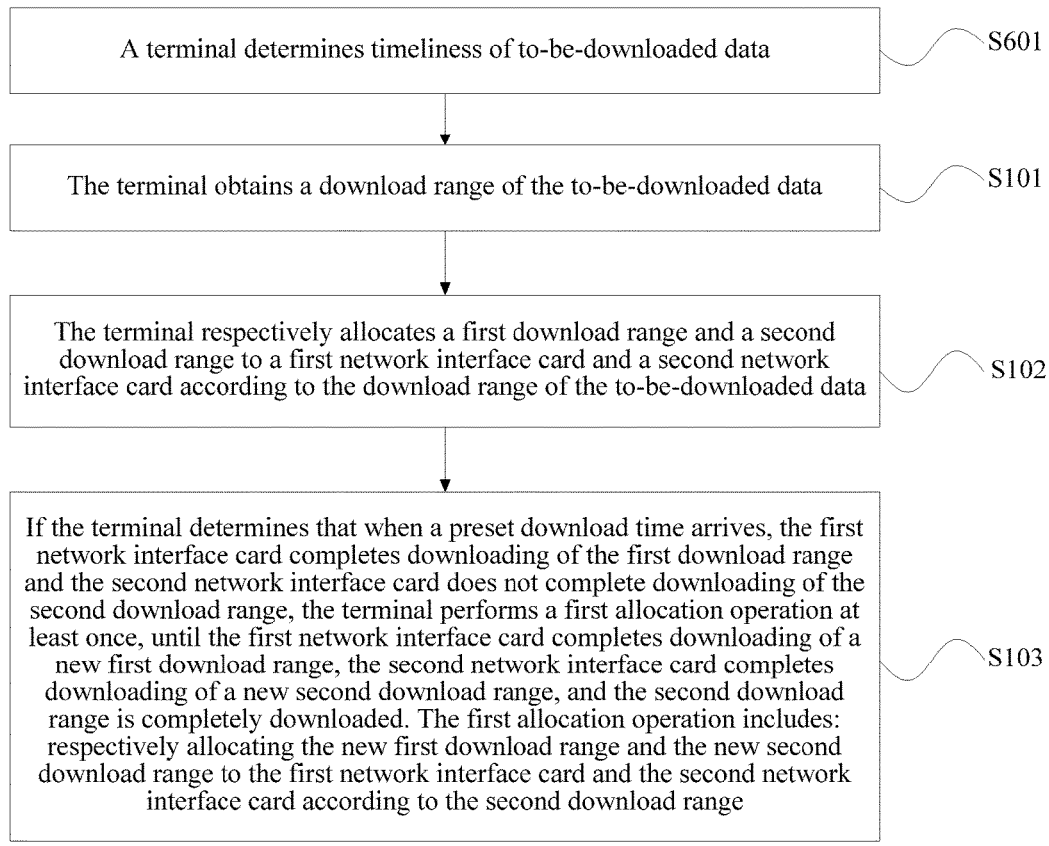
FIG. 6 is a schematic flowchart of Embodiment 6 of a data transmission method according to an embodiment of the present disclosure.

FIG. 6 is a schematic flowchart of Embodiment 6 of a data transmission method according to an embodiment of the present disclosure. This embodiment includes a process in which a terminal determines timeliness of to-be-downloaded data before respectively allocating download ranges to a first network interface card and a second network interface card. As shown in FIG. 4, before S101 or S201 or S501 described above (FIG. 4 shows only a schematic diagram before S101), the method further includes the following steps.

S601. The terminal determines the timeliness of the to-be-downloaded data.

Optionally, the timeliness in this embodiment may be construed as a requirement of a user on a display speed of to-be-downloaded data, or may be construed as a requirement of a user on a time taken to obtain to-be-downloaded data. For example, if a user needs to obtain a video, and the user hopes to view the video smoothly, the user has a relatively high requirement on timeliness of the video during real-time downloading and real-time viewing on line. That is, the video is high-timeliness to-be-downloaded data.

The terminal may determine the timeliness of the to-be-downloaded data in the following two implementation manners.

Figure 7:
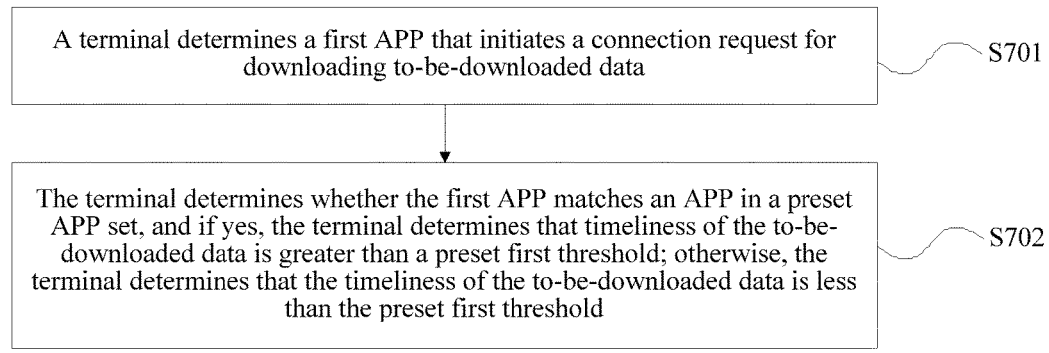
FIG. 7 is a schematic flowchart of Embodiment 7 of a data transmission method according to an embodiment of the present disclosure.

In a first implementation manner, referring to Embodiment 7 shown in FIG. 7, a method for determining the timeliness of the to-be-downloaded data by the terminal may include the following steps.

S701. The terminal determines a first APP that initiates a connection request for downloading the to-be-downloaded data.

S702. The terminal determines whether the first APP matches an APP in a preset APP set, and if yes, the terminal determines that the timeliness of the to-be-downloaded data is greater than a preset first threshold; otherwise, the terminal determines that the timeliness of the to-be-downloaded data is less than the preset first threshold.

Optionally, the terminal may determine, by using a processor or detection software in a processor, an APP that is used for sending the connection request for initiating downloading of the to-be-downloaded data, determine that the APP is the first APP, and then determine whether the first APP matches an APP in the preset APP set. A program corresponding to the APP in the preset APP set may be loaded to the terminal by the terminal by using a corresponding loader program, and may be prestored in a memory of the terminal or a server on a network side; or may be preset for the terminal by using a jig on a production line when the terminal leaves a factory, or may be stored in the terminal by a user according to usage experience. The APP in the preset APP set may be a video APP such as Youku, or Sohu video.

When the terminal determines that the first APP matches the foregoing APP in the preset APP set, the terminal determines that timeliness of to-be-downloaded data requested by the first APP is greater than a first preset threshold. That is, the to-be-downloaded data may be a file having a relatively high requirement on timeliness. When the terminal determines that the first APP does not match the foregoing APP in the preset APP set, the terminal determines that timeliness of to-be-downloaded data requested by the first APP is less than the preset first threshold. That is, the to-be-downloaded data may be a file having a relatively low requirement on timeliness. It should be noted that "match" mentioned herein may be understood as whether an attribute of the first APP is the same as or similar to that of the APP in the preset APP set. For example, it is assumed that the foregoing preset APP set includes four APPs, Youku, Sohu, Mango TV, and Tudou. However, the first APP determined by the terminal is "Baidu video". The terminal may also consider that the first APP matches the APP in the preset APP set. Optionally, the terminal may determine whether a type of data historically downloaded by the APP in the preset APP set is similar to a data type of to-be-downloaded data currently to be downloaded by the first APP, and further determine whether the first APP matches the APP in the preset APP set.

Figure 8:
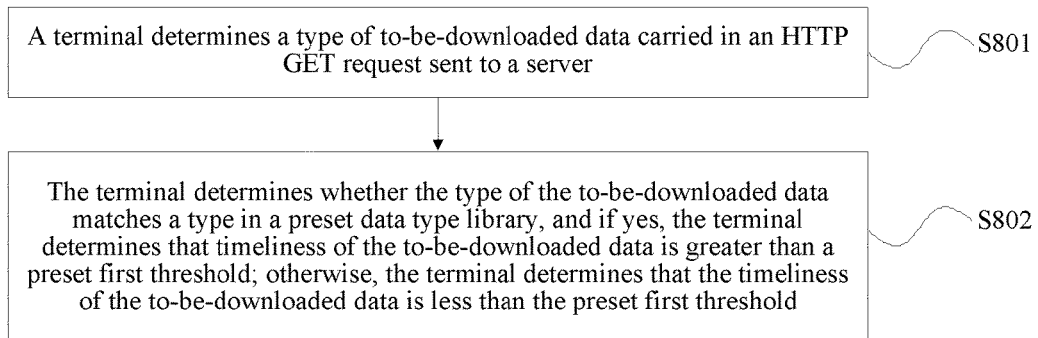
FIG. 8 is a schematic flowchart of Embodiment 8 of a data transmission method according to an embodiment of the present disclosure.

In a second implementation manner, referring to Embodiment 8 shown in FIG. 8, a method for determining the timeliness of the to-be-downloaded data by the terminal may include the following steps.

S801. The terminal determines a type of to-be-downloaded data carried in an HTTP GET request sent to a server.

The terminal may send an HTTP GET request to a server on a network side according to a website link clicked by a user, to request establishing a connection to the server, and the terminal may determine a type of the to-be-downloaded data according to the HTTP GET request.

S802. The terminal determines whether the type of the to-be-downloaded data matches a type in a preset data type library, and if yes, the terminal determines that the timeliness of the to-be-downloaded data is greater than a preset first threshold; otherwise, the terminal determines that the timeliness of the to-be-downloaded data is less than the preset first threshold.

The terminal may determine, according to the foregoing determined type of the to-be-downloaded data, whether the type of the to-be-downloaded data matches a type in a preset data type library. A data type in the preset data type library may be loaded to the terminal by the terminal by using a corresponding loader program, and may be prestored in a memory of the terminal or a server on a network side; or may be preset for the terminal by using a jig on a production line when the terminal leaves a factory, or may be stored in the terminal by a user according to usage experience. The data type in the preset data type library may be types such as .mp4, .flv, .rm, .rmvb, .avi, and .wmv.

When the terminal determines that the type of the to-be-downloaded data matches the data type in the foregoing preset data type library, the terminal determines that the timeliness of the to-be-downloaded data is greater than the preset first threshold. That is, the to-be-downloaded data may be a file having a relatively high requirement on timeliness. When the terminal determines that the type of the to-be-downloaded data does not match the data type in the foregoing preset data type library, the terminal determines that the timeliness of the to-be-downloaded data is less than the preset first threshold. That is, the to-be-downloaded data may be a file having a relatively low requirement on timeliness. It should be noted that "match" mentioned herein may be understood as whether the type of the to-be-downloaded data is the same as or similar to the data type in the preset data type library. For example, it is assumed that the foregoing preset data type library includes four types, .mp4, .flv, .rm, and .rmvb. However, the terminal determines that the type of the to-be-downloaded data is ".wmv". The terminal may also consider that the type of the to-be-downloaded data matches the data type in the preset data type library.

Optionally, in this embodiment of the present disclosure, when the terminal determines that the timeliness of the to-be-downloaded data is greater than the preset first threshold, and when the first network interface card completes the downloading of the first download range and the second network interface card does not complete the second download range of the second network interface card, the terminal may refer to all the allocation manners in the foregoing Embodiment 1 to Embodiment 3. Preferably, the terminal may select the solutions of the first implementation manner and the second implementation manner in Embodiment 2 and Embodiment 3 and a possible implementation manner of the foregoing Embodiment 3. When the terminal determines that the timeliness of the to-be-downloaded data is less than the preset first threshold, and when the first network interface card completes the downloading of the first download range and the second network interface card does not complete the second download range of the second network interface card, the terminal may also refer to all the allocation manners in the foregoing Embodiment 1 to Embodiment 3. Preferably, the terminal may select the solutions of the third implementation manner and the fourth implementation manner in Embodiment 2 and Embodiment 3.

According to the data transmission method provided in this embodiment of the present disclosure, for to-be-downloaded data having different timeliness, a terminal may select different download range allocation manners, so that download ranges respectively allocated by the terminal to a first network interface card and a second network interface card have proper amounts and are in time. This avoids a delay in downloading data, and better ensures real-time downloading of the to-be-downloaded data.

Persons of ordinary skill in the art may understand that, all or some of the steps of the foregoing method embodiments may be implemented by a program instructing relevant hardware. The foregoing programs may be stored in a computer readable storage medium. When the program runs, the steps of the foregoing method embodiments are performed. The foregoing storage medium includes various mediums capable of storing program code, such as a ROM, a RAM, a magnetic disk, and an optical disc.

Figure 9:
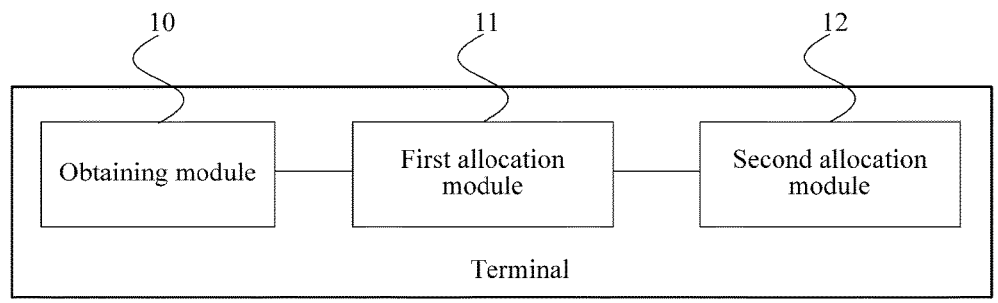
FIG. 9 is a schematic structural diagram of Embodiment 1 of a terminal according to an embodiment of the present disclosure.

FIG. 9 is a schematic structural diagram of Embodiment 1 of a terminal according to an embodiment of the present disclosure. As shown in FIG. 9, the terminal includes an obtaining module 10, a first allocation module 11, and a second allocation module 12.

The obtaining module 10 is configured to obtain, by the terminal, a download range of to-be-downloaded data. The first allocation module 11 is configured to respectively allocate a first download range and a second download range to the first network interface card and the second network interface card according to the download range of the to-be-downloaded data. The second allocation module 12 is configured to if it is determined that when a preset download time arrives, the first network interface card completes downloading of the first download range and the second network interface card does not complete downloading of the second download range, perform a first allocation operation at least once, until the first network interface card completes a new first download range, the second network interface card completes a new second download range, and the second download range is completely downloaded. The first allocation operation includes respectively allocating the new first download range and the new second download range to the first network interface card and the second network interface card according to the second download range.

The terminal provided in this embodiment of the present disclosure can perform the foregoing method embodiments, and the implementation principles and technical effects thereof are similar. Details are not described herein again.

In a possible implementation manner of this embodiment of the present disclosure, the first allocation module 11 is configured to divide an entire download range of the to-be-downloaded data into the first download range and the second download range according to a network speed ratio between the first network interface card and the second network interface card, and respectively allocate the first download range and the second download range to the first network interface card and the second network interface card.

In another possible implementation manner of this embodiment of the present disclosure, the first allocation module 11 is configured to divide a partial download range of the to-be-downloaded data into the first download range and the second download range according to a preset allocation rule, and respectively allocate the first download range and the second download range to the first network interface card and the second network interface card. The second allocation module 12 is further configured to perform a second allocation operation at least once, until the to-be-downloaded data is completely downloaded. The second allocation operation includes respectively allocating next-time data download ranges to the first network interface card and the second network interface card from a current remaining download range of the to-be-downloaded data.

The terminal provided in this embodiment of the present disclosure can perform the foregoing method embodiments, and the implementation principles and technical effects thereof are similar. Details are not described herein again.

In a third possible implementation manner of this embodiment of the present disclosure, the second allocation module 12 is configured to according to the preset allocation rule, respectively allocate the new first download range and the new second download range to the first network interface card and the second network interface card from the second download range; or respectively allocate the new first download range and the new second download range to the first network interface card and the second network interface card from a remaining download range of the second download range.

In a fourth possible implementation manner of this embodiment of the present disclosure, the second allocation module 12 is configured to allocate, from a current remaining download range of the to-be-downloaded data, a next-time download range to the first network interface card that completes the first download range, and further determine whether the second network interface card completes, when a preset moment arrives, downloading of the second download range; and if not, after the first network interface card completes downloading of a current download range, respectively allocate the new first download range and the new second download range to the first network interface card and the second network interface card according to the preset allocation rule and from a remaining download range of the second download range.

In a fifth possible implementation manner of this embodiment of the present disclosure, the second allocation module 12 is configured to determine, according to a current network speed of the second network interface card, a first time that is needed by the second network interface card to download a remaining download range of the second download range; and when it is determined that the first time is longer than a first preset time, respectively allocate the new first download range and the new second download range to the first network interface card and the second network interface card according to the preset allocation rule and from the remaining download range of the second download range.

In a sixth possible implementation manner of this embodiment of the present disclosure, the second allocation module 12 is configured to determine, according to a current network speed of the second network interface card, a first time that is needed by the second network interface card to download a remaining download range of the second download range; determine, according to a current network speed of the first network interface card and the current network speed of the second network interface card, a second time that is needed by the first network interface card and the second network interface card to jointly download the second download range; and when it is determined that the first time is longer than the second time, respectively allocate the new first download range and the new second download range to the first network interface card and the second network interface card according to the preset allocation rule and from the second download range.

The terminal provided in this embodiment of the present disclosure can perform the foregoing method embodiments, and the implementation principles and technical effects thereof are similar. Details are not described herein again.

Figure 10:
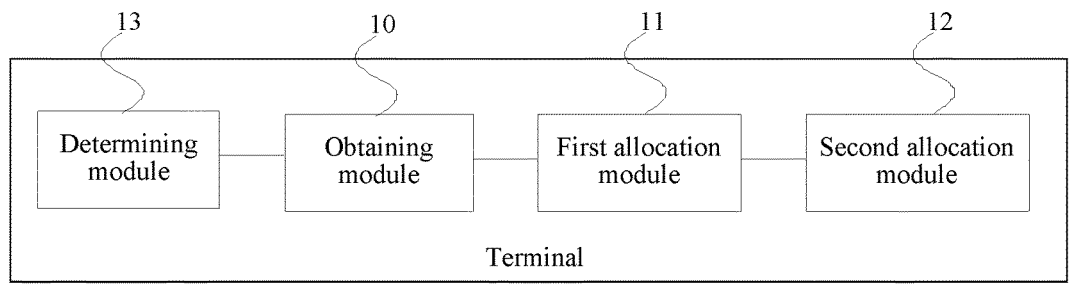
FIG. 10 is a schematic structural diagram of Embodiment 2 of a terminal according to an embodiment of the present disclosure.

FIG. 10 is a schematic structural diagram of Embodiment 2 of a terminal according to an embodiment of the present disclosure. Based on the foregoing embodiment, as shown in FIG. 10, the terminal may further include a determining module 13. The determining module 13 is configured to determine timeliness of to-be-downloaded data.

Optionally, the determining module 13 may be configured to determine a first APP that initiates a connection request for downloading the to-be-downloaded data; determine whether the first APP matches an APP in a preset APP set; and if yes, determine that the timeliness of the to-be-downloaded data is greater than a preset first threshold; otherwise, determine that the timeliness of the to-be-downloaded data is less than the preset first threshold.

Optionally, the determining module 13 may be configured to determine a type of to-be-downloaded data carried in a HTTP GET request sent to a server; determine whether the type of the to-be-downloaded data matches a type in a preset data type library; and if yes, determine that the timeliness of the to-be-downloaded data is greater than a preset first threshold; otherwise, determine that the timeliness of the to-be-downloaded data is less than the preset first threshold.

Further, the foregoing preset allocation rule is a product of the current network speed of the first network interface card or the second network interface card and the preset download time.

The terminal provided in this embodiment of the present disclosure can perform the foregoing method embodiments, and the implementation principles and technical effects thereof are similar. Details are not described herein again.

Figure 11:
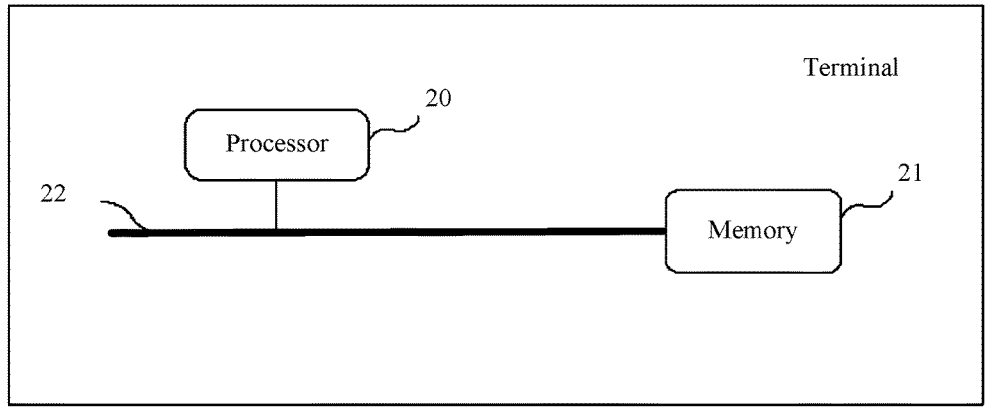
FIG. 11 is a schematic structural diagram of Embodiment 3 of a terminal according to an embodiment of the present disclosure.

FIG. 11 is a schematic structural diagram of Embodiment 3 of a terminal according to an embodiment of the present disclosure. As shown in FIG. 11, the terminal includes a processor 20, for example, a CPU, a memory 21, and at least one communications bus 22. The communications bus 22 is configured to implement communication connection between components. The memory 21 may include a high-speed RAM memory, or may further include a non-transitory memory NVM, for example, at least one magnetic disk storage. The memory 21 may store various programs, so as to implement various processing functions and implement method steps of this embodiment.

The processor 20 is configured to: obtain a download range of to-be-downloaded data, respectively allocate a first download range and a second download range to the first network interface card and the second network interface card according to the download range of the to-be-downloaded data, and if it is determined that when a preset download time arrives, the first network interface card completes downloading of the first download range and the second network interface card does not complete downloading of the second download range, perform a first allocation operation at least once, until the first network interface card completes a new first download range, the second network interface card completes a new second download range, and the second download range is completely downloaded. The first allocation operation includes respectively allocating the new first download range and the new second download range to the first network interface card and the second network interface card according to the second download range.

The terminal provided in this embodiment of the present disclosure can perform the foregoing method embodiments, and the implementation principles and technical effects thereof are similar. Details are not described herein again.

Optionally, the processor 20 is configured to divide an entire download range of the to-be-downloaded data into the first download range and the second download range according to a network speed ratio between the first network interface card and the second network interface card, and respectively allocate the first download range and the second download range to the first network interface card and the second network interface card.

Optionally, the processor 20 is configured to divide a partial download range of the to-be-downloaded data into the first download range and the second download range according to a preset allocation rule, and respectively allocate the first download range and the second download range to the first network interface card and the second network interface card; and is further configured to after performing a first allocation operation at least once, until the first network interface card completes the new first download range, the second network interface card completes the new second download range, and the second download range is completely downloaded, perform a second allocation operation at least once, until the to-be-downloaded data is completely downloaded. The second allocation operation includes respectively allocating, by the terminal, next-time data download ranges to the first network interface card and the second network interface card from a current remaining download range of the to-be-downloaded data.

Optionally, the processor 20 is configured to respectively allocate the new first download range and the new second download range to the first network interface card and the second network interface card according to the preset allocation rule and from the second download range; or respectively allocate the new first download range and the new second download range to the first network interface card and the second network interface card according to the preset allocation rule and from a remaining download range of the second download range.

Optionally, the processor 20 is configured to allocate, from a current remaining download range of the to-be-downloaded data, a next-time download range to the first network interface card that completes the first download range, and further determine whether the second network interface card completes, when a preset moment arrives, downloading of the second download range; and if not, after the first network interface card completes downloading of a current download range, respectively allocate the new first download range and the new second download range to the first network interface card and the second network interface card according to the preset allocation rule and from a remaining download range of the second download range.

Optionally, the processor 20 is configured to determine, according to a current network speed of the second network interface card, a first time that is needed by the second network interface card to download a remaining download range of the second download range; and when it is determined that the first time is longer than a first preset time, respectively allocate the new first download range and the new second download range to the first network interface card and the second network interface card according to the preset allocation rule and from the remaining download range of the second download range.

Optionally, the processor 20 is configured to determine, according to a current network speed of the second network interface card, a first time that is needed by the second network interface card to download a remaining download range of the second download range; determine, according to a current network speed of the first network interface card and the current network speed of the second network interface card, a second time that is needed by the first network interface card and the second network interface card to jointly download the second download range; and when the first time is longer than the second time, respectively allocate the new first download range and the new second download range to the first network interface card and the second network interface card according to the preset allocation rule and from the second download range.

The foregoing preset allocation rule is a product of the current network speed of the first network interface card or the second network interface card and the preset download time.

The terminal provided in this embodiment of the present disclosure can perform the foregoing method embodiments, and the implementation principles and technical effects thereof are similar. Details are not described herein again.

Further, based on the foregoing embodiment, the foregoing processor 20 is further configured to determine timeliness of the to-be-downloaded data.

Optionally, the processor 20 is configured to determine a first APP that initiates a connection request for downloading the to-be-downloaded data; determine whether the first APP matches an APP in a preset APP set; and if yes, determine that the timeliness of the to-be-downloaded data is greater than a preset first threshold; otherwise, determine that the timeliness of the to-be-downloaded data is less than the preset first threshold.

Optionally, the processor 20 is configured to determine a type of to-be-downloaded data carried in a HTTP GET request sent to a server; determine whether the type of the to-be-downloaded data matches a type in a preset data type library; and if yes, determine that the timeliness of the to-be-downloaded data is greater than a preset first threshold; otherwise, determine that the timeliness of the to-be-downloaded data is less than the preset first threshold.

The terminal provided in this embodiment of the present disclosure can perform the foregoing method embodiments, and the implementation principles and technical effects thereof are similar. Details are not described herein again.

Figure 12:
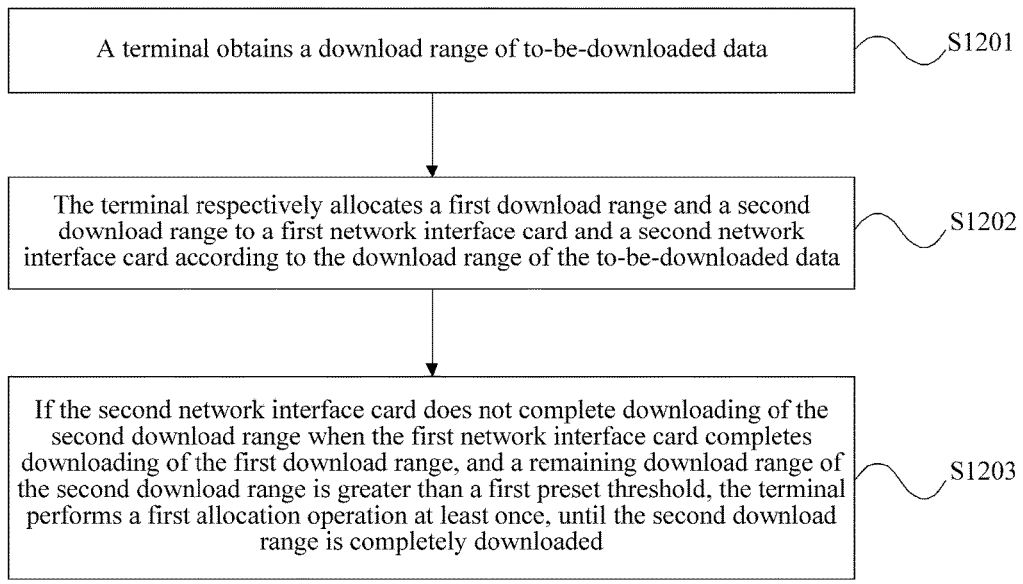
FIG. 12 is a schematic flowchart of Embodiment 9 of a data transmission method according to an embodiment of the present disclosure.

FIG. 12 is a schematic flowchart of Embodiment 9 of a data transmission method according to an embodiment of the present disclosure. The method is applicable to a terminal including a first network interface card and a second network interface card. Referring to FIG. 12, the method includes the following steps.

S1201. The terminal obtains a download range of to-be-downloaded data.

An APP on the terminal may initiates, to the terminal, a request for downloading or obtaining network data, or a user may click a link on a web page, so that the terminal learns a request of the user for obtaining network data. Therefore, the terminal may send an HTTP GET request to a server on a network side, to obtain a range of an entire to-be-downloaded file, and determine a download range of to-be-downloaded data in the to-be-downloaded file. The download range of the to-be-downloaded data may include a size of the to-be-downloaded data, or a byte start location of the to-be-downloaded data and a byte end location of downloaded data, or a byte start location of the to-be-downloaded data and a size of the to-be-downloaded data.

S1202. The terminal respectively allocates a first download range and a second download range to the first network interface card and the second network interface card according to the download range of the to-be-downloaded data.

S1203. If the second network interface card does not complete downloading of the second download range when the first network interface card completes downloading of the first download range, and a remaining download range of the second download range is greater than a first preset threshold, the terminal performs a first allocation operation at least once, until the second download range is completely downloaded.

The foregoing first allocation operation includes respectively allocating a new first download range and a new second download range to the first network interface card and the second network interface card according to the remaining download range of the second download range.

It should be noted that, in a download process, the terminal may be in a state of movement. That is, the terminal may be handed over between networks of different standards. Therefore, an unstable network speed of a network interface card or a sudden drop in a network speed of a network interface card is easily caused. In this embodiment, it is assumed that a network speed of the first network interface card is stable, and a network speed of the second network interface card suddenly drops because the terminal is handed over between networks of different standards. Therefore, when the first network interface card completes the downloading of the foregoing first download range, the second network interface card does not complete the downloading of the second download range.

The foregoing first network interface card and second network interface card are both general concepts. When the second network interface card completes the downloading of the second download range, and the first network interface card does not complete the downloading of the first download range, if a remaining download range of the first download range is greater than the first preset threshold, the second network interface card may also share the download task with the first network interface card. That is, in a download process after the new first download range and the new second download range are allocated, so long as one network interface card completes downloading while the other one does not complete downloading, and a requirement of the preset threshold is met, the download task of the network interface card that does not complete the downloading may be shared.

Moreover, in this embodiment of the present disclosure, allocating a download range to a network interface card may be understood as allocating a download range to a data transmission channel corresponding to the network interface card. For example, two network interface cards in the terminal include a China Mobile 4G card and a China Unicom 3G card. Allocating a download range to the China Mobile 4G card may be understood as allocating a download range to a data transmission channel corresponding to the China Mobile 4G card. In a implementation process, a data transmission channel corresponding to a network interface card may have a different name, for example, a download engine, but is not limited thereto.

In this embodiment, the terminal respectively allocates a first download range and a second download range to a first network interface card and a second network interface card according to a download range of to-be-downloaded data, when a first network interface card completes the first download range but the second network interface card does not complete the second download range, the terminal may perform a first allocation operation, to allocate a part of a remaining download range of the second download range to the first network interface card, so that the first network interface card shares a download task with the second network interface card. This avoids a case of an extremely long download time or a download failure because the second network interface card keeps downloading an allocated download task at a relatively low network speed. That is, download duration of to-be-downloaded data is reduced, and download efficiency of a terminal is improved, so that reliable downloading of data can be ensured.

Further, before the terminal performs the foregoing first allocation operation, the method may further include determining, by the terminal, whether there is an undownloaded range in the download range of the to-be-downloaded data except the first download range and the second download range, and if yes, using a first value as the first preset threshold, or if not, using a second value as the first preset threshold. The first value is greater than the second value.

That is, the first download range and the second download range in the download range of the to-be-downloaded data are allocated to the first network interface card and the second network interface card for downloading. When the first network interface card completes the downloading of the foregoing first download range and the second network interface card does not complete the downloading of the second download range, the terminal may first determine whether there is a part, which is not allocated to the first network interface card or the second network interface card for downloading, in the download range of the to-be-downloaded data. If yes, the foregoing first preset threshold is relatively large. If not, the foregoing first preset threshold may be a relatively small value. For example, during implementation, the first value may be four megabits (M), and the second value may be 1 M.

Figure 13:
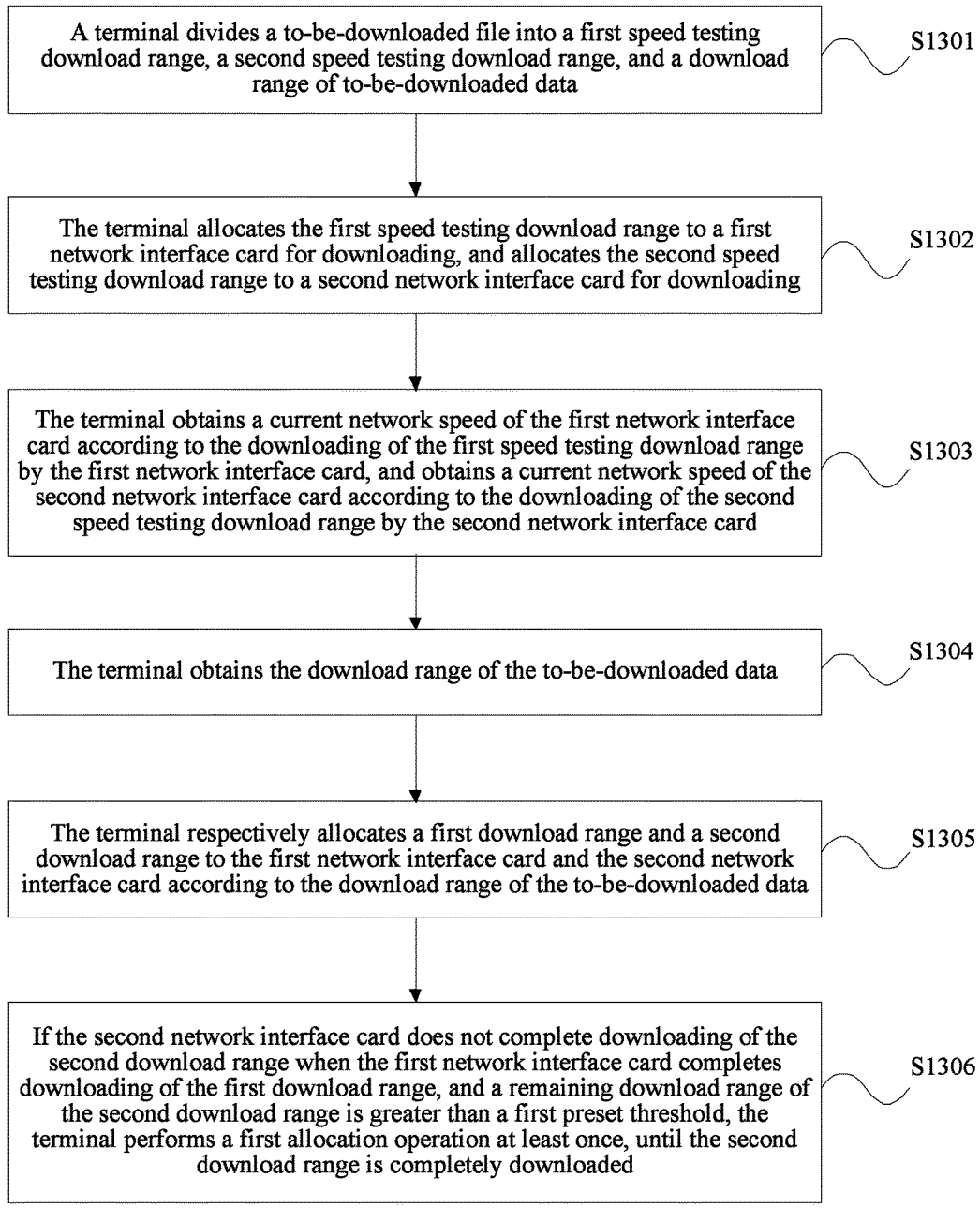
FIG. 13 is a schematic flowchart of Embodiment 10 of a data transmission method according to an embodiment of the present disclosure.

FIG. 13 is a schematic flowchart of Embodiment 10 of a data transmission method according to an embodiment of the present disclosure. As shown in FIG. 13, the method includes the following steps.

S1301. A terminal divides a to-be-downloaded file into a first speed testing download range, a second speed testing download range, and a download range of to-be-downloaded data.

The to-be-downloaded file may refer to an entire download object to be downloaded by the terminal. For example, the to-be-downloaded file is a data packet of 100 M. Two speed testing packets, that is, a first speed testing download range and a second speed testing download range, are first obtained by dividing the entire to-be-downloaded file, and a remaining part is used as the download range of the foregoing to-be-downloaded data.

S1302. The terminal allocates the first speed testing download range to a first network interface card for downloading, and allocates the second speed testing download range to a second network interface card for downloading.

The first speed testing download range and the second speed testing download range may be obtained through division according to current network standards of the first network interface card and the second network interface card. However, the present disclosure is not limited thereto. It is assumed that the first network interface card is currently in a 4G network, and the second network interface card is in a 3G network. The first speed testing download range allocated to the first network interface card is greater than the second speed testing download range allocated to the second network interface card. 10 M (0 M to 10M) of 100 M is allocated to the first speed testing download range, and 1 M (10 M to 11 M) is allocated to the second speed testing download range.

In a implementation process, the terminal may obtain, through division, the first speed testing download range and the second speed testing download range by using Table 1 as a standard. However, the present disclosure is not limited thereto.

TABLE 1

| Download engine standard of a first network interface card | Download engine standard of a second network interface card | Size (MB) of a first speed testing download range | Size (MB) of a second speed testing download range |
|---|---|---|---|
| 4G | 3G | 10 | 1 |
| 3G | 4G | 1 | 10 |
| WCDMA 3G | EVDO 3G | 5 | 1 |
| EVDO 3G | WCDMA 3G | 1 | 5 |
| TDSCDMA 3G | EVDO 3G | 2 | 1 |
| EVDO 3G | TDSCDMA 3G | 1 | 2 |

In Table 1, WCDMA 3G is a Wideband Code Division Multiple Access (WCDMA) 3rd generation mobile telecommunications (3G) network. The full name of Evolution Data Only (EVDO) 3G is CDMA2000 1×EV-DO. TDSCDMA 3G is Time Division-Synchronous Code Division Multiple Access 3G. 4G is the 4th generation mobile telecommunications.

S1303. The terminal obtains a current network speed of the first network interface card according to the downloading of the first speed testing download range by the first network interface card, and obtains a current network speed of the second network interface card according to the downloading of the second speed testing download range by the second network interface card.

S1304. The terminal obtains the download range of the to-be-downloaded data.

S1305. The terminal respectively allocates a first download range and a second download range to the first network interface card and the second network interface card according to the download range of the to-be-downloaded data.

S1306. If the second network interface card does not complete downloading of the second download range when the first network interface card completes downloading of the first download range, and a remaining download range of the second download range is greater than a first preset threshold, the terminal performs a first allocation operation at least once, until the second download range is completely downloaded.

In another embodiment, in the process of downloading the foregoing first speed testing download range and second speed testing download range, the first network interface card and the second network interface card may share the download task with each other. After the terminal allocates the first speed testing download range to the first network interface card for downloading, and allocates the second speed testing download range to the second network interface card for downloading, if the second network interface card does not complete the second speed testing download range when the first network interface card completes the first speed testing download range, and a remaining download range of the second speed testing download range that is not completed by the second network interface card is greater than a second preset threshold, the terminal performs a second allocation operation at least once, until the second speed testing download range is completely downloaded. In a implementation process, the second preset threshold may be equal to the foregoing first preset threshold. However, the present disclosure is not limited thereto.

The second allocation operation includes respectively allocating a new first speed testing download range and a new second speed testing download range to the first network interface card and the second network interface card according to the remaining download range of the second speed testing download range. That is, in a download process after the new first speed testing download range and the new second speed testing download range are allocated, so long as one network interface card completes downloading while the other one does not complete downloading, and a requirement of the preset threshold is met, the download task of the network interface card that does not complete the downloading may be shared.

The respectively allocating, by the terminal, a new first speed testing download range and a new second speed testing download range to the first network interface card and the second network interface card according to the remaining download range of the second speed testing download range may be dividing, by the terminal, the remaining download range of the second speed testing download range into a first speed testing download subrange and a second speed testing download subrange according to a current network speed ratio between the first network interface card and the second network interface card, using the first speed testing download subrange as the new first speed testing download range, and using a sum of the second speed testing download range that is downloaded by the second network interface card and the second speed testing download subrange as the new second speed testing download range, or using the new second speed testing download range as a new second speed testing download range.

It should be noted that before the remaining download range of the second speed testing download range is divided into the first speed testing download subrange and the second speed testing download subrange, a buffer range may further be reserved from the second network interface card for downloading, and a remaining download range of the second speed testing download range except the buffer range is divided. The first speed testing download subrange may be used as the new first speed testing download range, and a sum of the second speed testing download range that is downloaded by the second network interface card, the buffer range, and the second speed testing download subrange may be used as the new second speed testing download range, or a sum of the buffer range and the second speed testing download subrange may be used as the new second speed testing download range.

For example, it is assumed that the first network interface card is currently in a 4G network, and the second network interface card is in a 3G network. The first speed testing download range allocated to the first network interface card is 10 M (0 M to 10 M). The second speed testing download range allocated to the second network interface card is 1 M (10 M to 11 M). After the first network interface card completely downloads the first speed testing download range, an actual download range of the second speed testing download range of the second network interface card is 0.5 M (10 M to 10.5 M), and 0.5 M remains. It is assumed that the second preset threshold is 0.4 M, and the remaining amount being 0.5 M of the second network interface card is greater than the second preset threshold being 0.4 M. The remaining amount being 0.5 M of the second network interface card is divided according to a current network speed ratio. It is assumed that a current network speed ratio between the first network interface card and the second network interface card is 20:1, and the buffer range is 0.1 M. A download amount allocated to the first network interface card is $(0.5-0.1)*19/20=0.38$ M, and a download amount allocated to the second network interface card is $(0.5-0.1)*1/20+0.1=0.12$ M. A new first speed testing download subrange is 0.38 M (10.62 M to 11 M). A new second speed testing download subrange is 0.12 (10.5 to 10.62), or a new second speed testing download subrange is 0.62 (10 to 10.62).

A case in which the second speed testing download subrange is 0.12 is a case in which the terminal allocates the new second speed testing download subrange to the second network interface card. A case in which the second speed testing download subrange is 0.62 is a case in which the terminal modifies an original second speed testing download range for the second network interface card, to obtain the new second speed testing download subrange. Both the foregoing cases are supported by this embodiment of the present disclosure.

In this embodiment, the foregoing to-be-downloaded file is classified as a common file and a large file. A file greater than a third preset threshold is used as a large file, and a file less than or equal to the third preset threshold is used as a common file.

For the common file, that is, if the to-be-downloaded file is less than or equal to the third preset threshold, for the respectively allocating, by the terminal, a first download range and a second network interface card to the first network interface card and the second download range according to the download range of the to-be-downloaded data, there may be two implementation manners.

(1). The terminal divides the to-be-downloaded file into a first part and a second part according to a current network speed ratio between the first network interface card and the second network interface card, obtains, through division, the first download range in the download range of the to-be-downloaded data according to a value obtained after a size of the first speed testing download range is deducted from the first part, and obtains, through division, the second download range in the download range of the to-be-downloaded data according to a value obtained after a size of the second speed testing download range is deducted from the second part.

For example, a current network speed of the first network interface card is 9 M/s. A current network speed of the second network interface card is 1 M/s. A to-be-downloaded file is 30 M, and after the to-be-downloaded file is divided into two parts according to a network speed ratio, a first part is 27 M, and a second part is 3 M. It is assumed that the size of the first speed testing download range is 5 M (0 M to 5 M), and the size of the second speed testing download range is 1 M (5 M to 6 M). Therefore, a size of the first download range is 27−5=22 M, and a size of the second download range is 3−1=2 M. According to the foregoing values, in the download range (6 M to 30 M) of the to-be-downloaded data, 6 M to 28 M is allocated as the first download range and 28 M to 30 M is allocated as the second download range.

(2) The terminal divides the download range of the to-be-downloaded data into the first download range and the second download range according to a current network speed ratio between the first network interface card and the second network interface card.

For example, it is assumed that a current network speed of the first network interface card is 9 M/s, a current network speed of the second network interface card is 1 M/s, and a to-be-downloaded file is 30 M. It is assumed that the size of the first speed testing download range is 5 M (0 M to 5 M), and the size of the second speed testing download range is 1 M (5 M to 6 M). After the to-be-downloaded file is divided into two parts, a size of the first download range is (30−5−1)*9/10=21.6 M, and a size of the second download range is (30−5−1)*1/10=2.4 M. According to the foregoing values, in the download range (6 M to 30 M) of the to-be-downloaded data, 6 M to 27.6 M is allocated as the first download range and 27.6 M to 30 M is allocated as the second download range.

Figure 14:
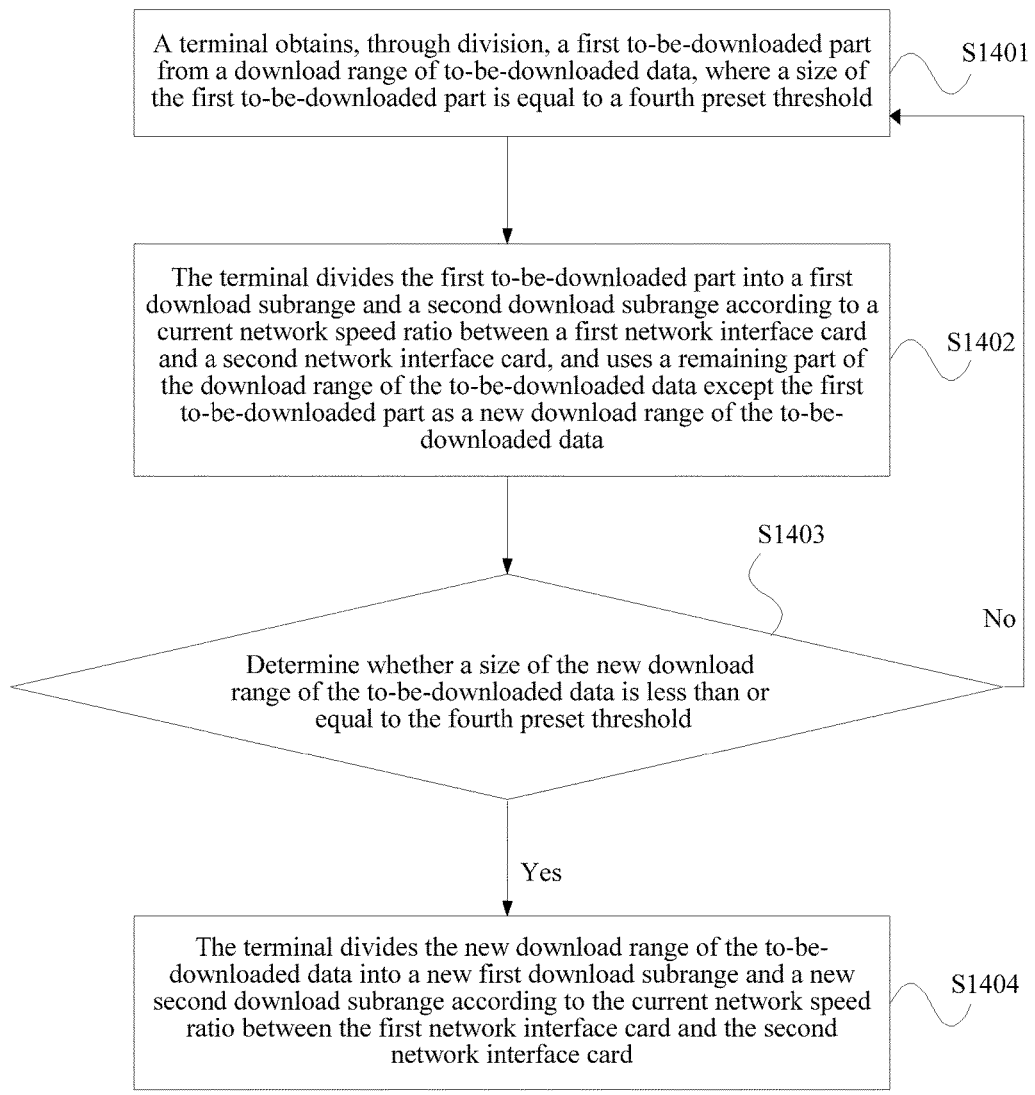
FIG. 14 is a schematic flowchart of Embodiment 11 of a data transmission method according to an embodiment of the present disclosure.

FIG. 14 is a schematic flowchart of Embodiment 11 of a data transmission method according to an embodiment of the present disclosure. For a large file, that is, if a to-be-downloaded file is greater than a third preset threshold, as shown in FIG. 14, the respectively allocating, by the terminal, a first download range and a second download range to the first network interface card and the second network interface card according to the download range of the to-be-downloaded data includes the following steps.

S1401. The terminal obtains, through division, a first to-be-downloaded part from the download range of the to-be-downloaded data, where a size of the first to-be-downloaded part is equal to a fourth preset threshold.

The fourth preset threshold may be determined according to a download partition of the terminal. The fourth preset threshold is equal to a size of the download partition of the terminal, but is not limited thereto. Alternatively, the fourth preset threshold may be less than the size of the download partition of the terminal.

For example, the to-be-downloaded file is 100 M, the fourth preset threshold being equal to the size of the download partition is 20 M, a size of the first speed testing download range is 5 M, and a size of the second speed testing download range is 1 M. In a download process of the terminal, there are four to-be-downloaded parts with each one being 20 M and one to-be-downloaded part of 14 M.

S1402. The terminal divides the first to-be-downloaded part into a first download subrange and a second download subrange according to a current network speed ratio between the first network interface card and the second network interface card, and uses a remaining part of the download range of the to-be-downloaded data except the first to-be-downloaded part as a new download range of the to-be-downloaded data.

The first download subrange belongs to the first download range, and the second download subrange belongs to the second download range. That is, the first download subrange is allocated to the first network interface card for downloading, and the second download subrange is allocated to the second network interface card for downloading.

S1403. The terminal determines whether a size of the new download range of the to-be-downloaded data is less than or equal to the fourth preset threshold, and if yes, perform S1404, or if not, go back to S1401.

S1404. The terminal divides the new download range of the to-be-downloaded data into a new first download subrange and a new second download subrange according to the current network speed ratio between the first network interface card and the second network interface card. The new first download subrange belongs to the first download range, and the new second download subrange belongs to the second download range. That is, the new first download subrange is allocated to the first network interface card for downloading, and the new second download subrange is allocated to the second network interface card for downloading.

Further, for the foregoing large file, the first to-be-downloaded part repeatedly needs to be obtained, through division, from the download range of the to-be-downloaded data. In this process, after obtaining, through division, the first to-be-downloaded part for the first time, the terminal respectively allocates the first download subrange and the second download subrange that are obtained through division to the first network interface card and the second network interface card for downloading. If the second network interface card does not complete downloading of the second download subrange when the first network interface card completes downloading of the first download subrange, and a download amount not completed by the second network interface card is less than or equal to a fifth preset threshold, the terminal obtains, through division, a second to-be-downloaded part from the new download range of the to-be-downloaded data, that is, obtains, through division, a second to-be-downloaded part from a remaining part that is obtained after the first to-be-downloaded part is obtained by dividing the download range of the to-be-downloaded data, where a size of the second to-be-downloaded part is also equal to the fourth preset threshold. Further, the terminal also divides the second to-be-downloaded part into a third download subrange and a fourth download subrange according to the current network speed ratio between the first network interface card and the second network interface card. If the second network interface card does not complete the second download subrange when the first network interface card completes the first download subrange and completes the third download subrange, the terminal allocates the fourth download subrange to the first network interface card for downloading. That is, in a circular allocation process, the first network interface card and the second network interface card may share download tasks with each other. The third download subrange belongs to the first download range, and the fourth download subrange belongs to the second download range. That is, the third download subrange is allocated to the first network interface card for downloading, and the fourth download subrange is allocated to the second network interface card for downloading. After completing the downloading of the first download subrange, the first network interface card directly downloads the third download subrange. If after the first network interface card also completes the downloading of the third download subrange, the second network interface card still does not complete the downloading of the second download subrange, the fourth download subrange is directly allocated to the first network interface card for downloading. The foregoing fifth preset threshold may also be equal to the foregoing first preset threshold, but is not limited thereto.

Based on the foregoing embodiment, if the second network interface card does not complete downloading of the second download range when the first network interface card completes downloading of the first download range, and the remaining download range of the second download range is greater than the first preset threshold, the terminal performs a first allocation operation at least once. For the first allocation operation, the respectively allocating, by the terminal, a new first download range and a new second download range to the first network interface card and the second network interface card according to the remaining download range of the second download range may be dividing, by the terminal, the remaining download range of the second download range into a buffer range and a to-be-allocated range, and then respectively allocating the new first download range and the new second download range to the first network interface card and the second network interface card according to the to-be-allocated range. For example, it is assumed that an original second download range is 5 M to 30 M, and 5 M to 10 M have been downloaded. A remaining download range of the second download range is 10 M to 30 M. 2 M, that is, 10 M to 12 M, is used as the buffer range, and is reserved for the second network interface card for downloading. Then, 12 M to 30 M is used as the to-be-allocated range, and allocated to the first network interface card and the second network interface card.

The respectively allocating, by the terminal, the new first download range and the new second download range to the first network interface card and the second network interface card according to the to-be-allocated range may include dividing, by the terminal, the to-be-allocated range into a first to-be-allocated subrange and a second to-be-allocated subrange according to a current network speed ratio between the first network interface card and the second network interface card, using the first to-be-allocated subrange as the new first download range, and using a sum of a downloaded range of the second network interface card, the buffer range, and the second to-be-allocated subrange in the second download range as the new second download range. For example, a network speed ratio between the first network interface card and the second network interface card is 8:1, in the to-be-allocated range being 12 M to 30 M, (30−12)*8/9=16 M is allocated to the first network interface card as the new first download range. That is, the new first download range is 14 M to 30 M. The new second download range includes already downloaded 5 M to 10 M, a buffer range being 10 M to 12 M, and a size of the second to-be-allocated subrange being (30−12)*1/9=2 M. That is, the new first download range is 5 M to 14 M.

However, the present disclosure is not limited thereto. In another implementation manner, the second download range includes a buffer range being 10 M to 12 M, and a size of the second to-be-allocated subrange being (30−12)*1/9=2 M. That is, the new first download range is 10 M to 14 M. A case in which the second download range is 5 M to 14 M is a case in which the terminal modifies an original second download range for the second network interface card. A case in which the second download range is 10 M to 14 M is a case in which the terminal allocates the new second download range to the second network interface card. Both the foregoing cases are supported by this embodiment of the present disclosure.

In another embodiment, in S1203, that if the second network interface card does not complete downloading of the second download range when the first network interface card completes downloading of the first download range, and a remaining download range of the second download range is greater than a first preset threshold, the terminal performs a first allocation operation at least once is if the second network interface card does not complete the downloading of the second download range when the first network interface card completes the downloading of the first download range, there is no undownloaded range in the download range of the to-be-downloaded data except the first download range and the second download range, and the remaining download range of the second download range is greater than the first preset threshold, determining, by the terminal, whether a part, whose current download speed is greater than a current download speed of the second network interface card, of the first network interface card meets a preset condition, and if yes, performing, by the terminal, a first allocation operation at least once. That is, when there is no other undownloaded data other than the first download range and the second download range, it may further be determined whether the first network interface card is qualified to share with the second network interface card. That is, it is determined whether a part, whose current download speed is greater than the current download speed of the second network interface card, of the first network interface card meets a preset condition. The first network interface card helps the second network interface card in downloading only when the condition is met. Otherwise, the second network interface card voluntarily completes the downloading. Optionally, the preset condition may be the current download speed of the first network interface card is greater than 11.1% of the current download speed of the second network interface card.

Figure 15:
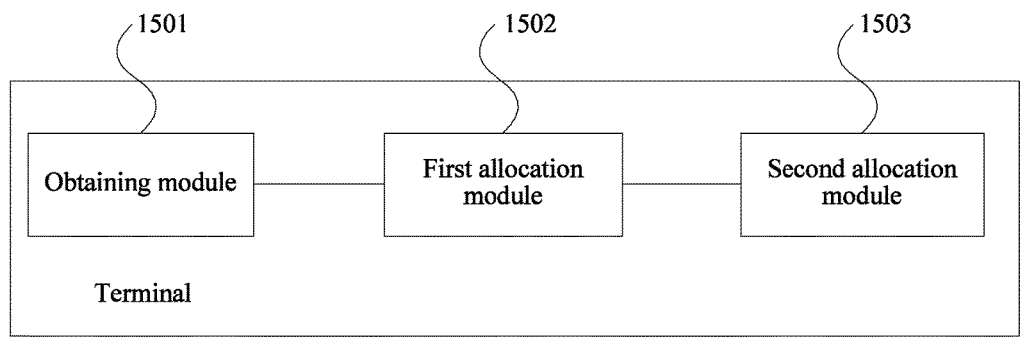
FIG. 15 is a schematic structural diagram of Embodiment 4 of a terminal according to an embodiment of the present disclosure.

FIG. 15 is a schematic structural diagram of Embodiment 4 of a terminal according to an embodiment of the present disclosure. As shown in FIG. 15, the terminal includes an obtaining module 1501, a first allocation module 1502, and a second allocation module 1503.

The obtaining module 1501 is configured to obtain a download range of to-be-downloaded data.

The first allocation module 1502 is configured to respectively allocate a first download range and a second download range to the first network interface card and the second network interface card according to the download range of the to-be-downloaded data.

The second allocation module 1503 is configured to if the second network interface card does not complete downloading of the second download range when the first network interface card completes downloading of the first download range, and a remaining download range of the second download range is greater than a first preset threshold, perform a first allocation operation at least once, until the second download range is completely downloaded.

The first allocation operation includes respectively allocating a new first download range and a new second download range to the first network interface card and the second network interface card according to the remaining download range of the second download range.

In this embodiment, the terminal respectively allocates a first download range and a second download range to a first network interface card and a second network interface card according to a download range of to-be-downloaded data, when a first network interface card completes the first download range but the second network interface card does not complete the second download range, the terminal may perform a first allocation operation, to allocate a part of a remaining download range of the second download range to the first network interface card, so that the first network interface card shares a download task with the second network interface card. This avoids a case of an extremely long download time or a download failure because the second network interface card keeps downloading an allocated download task at a relatively low network speed. That is, download duration of to-be-downloaded data is reduced, and download efficiency of a terminal is improved, so that reliable downloading of data can be ensured.

Figure 16:
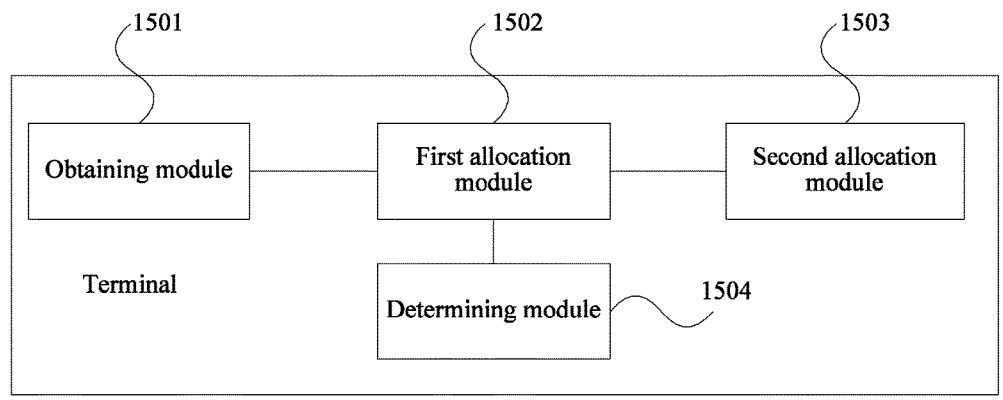
FIG. 16 is a schematic structural diagram of Embodiment 5 of a terminal according to an embodiment of the present disclosure.

FIG. 16 is a schematic structural diagram of Embodiment 5 of a terminal according to an embodiment of the present disclosure. As shown in FIG. 16, based on FIG. 15, the terminal may further include a determining module 1504 configured to before the second allocation module 1503 performs a first allocation operation at least once, determine whether there is an undownloaded range in the download range of the to-be-downloaded data except the first download range and the second download range, and if yes, use a first value as the first preset threshold, or if not, use a second value as the first preset threshold. The first value is greater than the second value.

Figure 17:
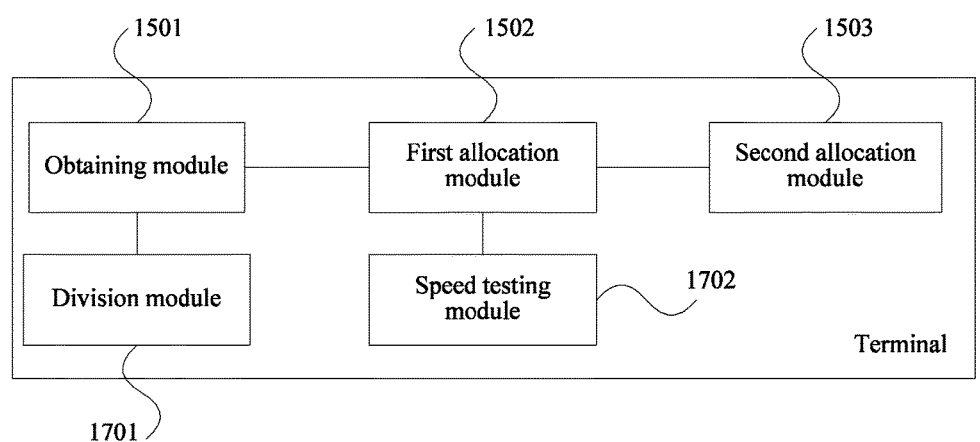
FIG. 17 is a schematic structural diagram of Embodiment 6 of a terminal according to an embodiment of the present disclosure.

FIG. 17 is a schematic structural diagram of Embodiment 6 of a terminal according to an embodiment of the present disclosure. As shown in FIG. 17, based on FIG. 15, the terminal may further include a division module 1701 and a speed testing module 1702. Certainly, the terminal may also include the determining module 1504 in FIG. 16.

The division module 1701 is configured to before the obtaining module 1501 obtains the download range of the to-be-downloaded data, divide a to-be-downloaded file into a first speed testing download range, a second speed testing download range, and the download range of the to-be-downloaded data.

The first allocation module 1502 is further configured to allocate the first speed testing download range to the first network interface card for downloading, and allocate the second speed testing download range to the second network interface card for downloading.

The speed testing module 1702 is configured to obtain a current network speed of the first network interface card according to the downloading of the first speed testing download range by the first network interface card, and obtain a current network speed of the second network interface card according to the downloading of the second speed testing download range by the second network interface card.

Further, based on the foregoing embodiments, the second allocation module 1503 is further configured to if, the second network interface card does not complete the second speed testing download range when the first network interface card completes the first speed testing download range, and a remaining download range of the second speed testing download range that is not completed by the second network interface card is greater than a second preset threshold, perform a second allocation operation at least once, until the second speed testing download range is completely downloaded. The second allocation operation includes respectively allocating a new first speed testing download range and a new second speed testing download range to the first network interface card and the second network interface card according to the remaining download range of the second speed testing download range.

In another embodiment, if the second network interface card does not complete the second speed testing download range when the first network interface card completes the first speed testing download range and begins to download the first download range, and a remaining download range of the second speed testing download range that is not completed by the second network interface card is less than or equal to a second preset threshold, the second allocation module 1503 is further configured to when the first network interface card completes the first download range and the second network interface card still does not complete the second speed testing download range, allocate the second download range to the first network interface card for downloading.

In this embodiment, the foregoing to-be-downloaded file is classified as a common file and a large file. A file greater than a third preset threshold is used as a large file, and a file less than or equal to the third preset threshold is used as a common file.

For a common file, that is, if the to-be-downloaded file is less than or equal to the third preset threshold, the first allocation module 1502 being configured to respectively allocate a first download range and a second download range to the first network interface card and the second network interface card according to the download range of the to-be-downloaded data is dividing the to-be-downloaded file into a first part and a second part according to a current network speed ratio between the first network interface card and the second network interface card, obtaining, through division, the first download range in the download range of the to-be-downloaded data according to a value obtained after a size of the first speed testing download range is deducted from the first part, and obtaining, through division, the second download range in the download range of the to-be-downloaded data according to a value obtained after a size of the second speed testing download range is deducted from the second part; or dividing the download range of the to-be-downloaded data into the first download range and the second download range according to a current network speed ratio between the first network interface card and the second network interface card.

For a large file, that is, if the to-be-downloaded file is greater than the third preset threshold, the first allocation module 1502 being configured to respectively allocate a first download range and a second download range to the first network interface card and the second network interface card according to the download range of the to-be-downloaded data is obtaining, through division, a first to-be-downloaded part from the download range of the to-be-downloaded data, where a size of the first to-be-downloaded part is equal to a fourth preset threshold; and dividing the first to-be-downloaded part into a first download subrange and a second download subrange according to a current network speed ratio between the first network interface card and the second network interface card, and using a remaining part of the download range of the to-be-downloaded data except the first to-be-downloaded part as a new download range of the to-be-downloaded data, where the first download subrange belongs to the first download range, and the second download subrange belongs to the second download range; until a size of the new download range of the to-be-downloaded data is less than or equal to the fourth preset threshold; and further, dividing the new download range of the to-be-downloaded data that is less than or equal to the third threshold into a new first download subrange and a new second download subrange according to the current network speed ratio between the first network interface card and the second network interface card, where the new first download subrange belongs to the first download range, and the new second download subrange belongs to the second download range.

Further, for the foregoing large file, in a process of sequential division, after the first allocation module 1502 uses the remaining part of the download range of the to-be-downloaded data except the first to-be-downloaded part as the new download range of the to-be-downloaded data, if the second network interface card does not complete downloading of the second download subrange when the first network interface card completes downloading of the first download subrange, and a remaining download range of the second download subrange is less than or equal to a fifth preset threshold, the first allocation module 1502 is further configured to obtain, through division, a second to-be-downloaded part from the new download range of the to-be-downloaded data, where a size of the second to-be-downloaded part is equal to the fourth preset threshold; divide the first to-be-downloaded part into a third download subrange and a fourth download subrange according to the current network speed ratio between the first network interface card and the second network interface card, where the third download subrange belongs to the first download range, and the fourth download subrange belongs to the second download range; and if the second network interface card does not complete the second download subrange when the first network interface card completes the first download subrange and completes the third download subrange, allocate the fourth download subrange to the first network interface card for downloading.

Based on the foregoing embodiment, the second allocation module 1503 being configured to respectively allocate the new first download range and the new second download range to the first network interface card and the second network interface card according to the remaining download range of the second download range is dividing the remaining download range of the second download range into a buffer range and a to-be-allocated range; and respectively allocating the new first download range and the new second download range to the first network interface card and the second network interface card according to the to-be-allocated range.

The second allocation module 1503 being configured to respectively allocate the new first download range and the new second download range to the first network interface card and the second network interface card according to the to-be-allocated range is dividing the to-be-allocated range into a first to-be-allocated subrange and a second to-be-allocated subrange according to a current network speed ratio between the first network interface card and the second network interface card, using the first to-be-allocated subrange as the new first download range, and using a sum of a downloaded range of the second network interface card, the buffer range, and the second to-be-allocated subrange in the second download range as the new second download range; or using the first to-be-allocated subrange as the new first download range, and using a sum of the buffer range and the second to-be-allocated subrange as the new second download range.

Similarly, the second allocation module 1503 being configured to respectively allocate the new first speed testing download range and the new second speed testing download range to the first network interface card and the second network interface card according to the remaining download range of the second speed testing download range is dividing the remaining download range of the second speed testing download range into a first speed testing download subrange and a second speed testing download subrange according to a current network speed ratio between the first network interface card and the second network interface card, using the first speed testing download subrange as the new first speed testing download range, and using a sum of the second speed testing download range that is downloaded by the second network interface card and the second speed testing download subrange as the new second speed testing download range, or using the new second speed testing download range as a new second speed testing download range.

Optionally, the second allocation module 1503 is configured to if the second network interface card does not complete the downloading of the second download range when the first network interface card completes the downloading of the first download range, there is no undownloaded range in the download range of the to-be-downloaded data except the first download range and the second download range, and the remaining download range of the second download range is greater than the first preset threshold, determine whether a part, whose current download speed is greater than a current download speed of the second network interface card, of the first network interface card meets a preset condition, and if yes, perform a first allocation operation at least once.

The terminal provided in this embodiment of the present disclosure can perform the foregoing method embodiments, and the implementation principles and technical effects thereof are similar. Details are not described herein again.

Another embodiment of the present disclosure further provides a terminal that is in a same structure as the terminal shown in FIG. 11. Referring to FIG. 11, the terminal includes a processor 20, for example, a CPU, a memory 21, and at least one communications bus 22. The communications bus 22 is configured to implement communication connection between components. The memory 21 may include a high-speed RAM memory, or may further include a non-transitory memory NVM, for example, at least one magnetic disk storage. The memory 21 may store various programs, so as to implement various processing functions and implement method steps of the embodiments shown in FIG. 12 to FIG. 14. The processor 20 is configured to obtain a download range of to-be-downloaded data; respectively allocate a first download range and a second download range to the first network interface card and the second network interface card according to the download range of the to-be-downloaded data; and if the second network interface card does not complete downloading of the second download range when the first network interface card completes downloading of the first download range, and a remaining download range of the second download range is greater than a first preset threshold, perform a first allocation operation at least once, until the second download range is completely downloaded; the first allocation operation includes respectively allocating a new first download range and a new second download range to the first network interface card and the second network interface card according to the remaining download range of the second download range.

Optionally, the processor 20 is configured to if the second network interface card does not complete the downloading of the second download range when the first network interface card completes the downloading of the first download range, there is no undownloaded range in the download range of the to-be-downloaded data except the first download range and the second download range, and the remaining download range of the second download range is greater than the first preset threshold, determine whether a part, whose current download speed is greater than a current download speed of the second network interface card, of the first network interface card meets a preset condition, and if yes, perform a first allocation operation at least once.

The terminal provided in this embodiment of the present disclosure can perform the foregoing method embodiments, and the implementation principles and technical effects thereof are similar. Details are not described herein again.

Further, the processor 20 is configured to before performing a first allocation operation at least once, determine whether there is an undownloaded range in the download range of the to-be-downloaded data except the first download range and the second download range, and if yes, use a first value as the first preset threshold, or if not, use a second value as the first preset threshold, where the first value is greater than the second value.

The processor 20 is configured to before obtaining the download range of the to-be-downloaded data, divide a to-be-downloaded file into a first speed testing download range, a second speed testing download range, and the download range of the to-be-downloaded data; allocate the first speed testing download range to the first network interface card for downloading, and allocate the second speed testing download range to the second network interface card for downloading; and obtain a current network speed of the first network interface card according to the downloading of the first speed testing download range by the first network interface card, and obtain a current network speed of the second network interface card according to the downloading of the second speed testing download range by the second network interface card.

Further, if the second network interface card does not complete the second speed testing download range when the first network interface card completes the first speed testing download range, and a remaining download range of the second speed testing download range that is not completed by the second network interface card is greater than a second preset threshold, the processor 20 performs a second allocation operation at least once, until the second speed testing download range is completely downloaded. The second allocation operation includes respectively allocating a new first speed testing download range and a new second speed testing download range to the first network interface card and the second network interface card according to the remaining download range of the second speed testing download range.

If the second network interface card does not complete the second speed testing download range when the first network interface card completes the first speed testing download range and begins to download the first download range, and a remaining download range of the second speed testing download range that is not completed by the second network interface card is less than or equal to a second preset threshold, the processor 20 is further configured to when the first network interface card completes the first download range and the second network interface card still does not complete the second speed testing download range, allocate the second download range to the first network interface card for downloading.

For a common file, that is, if the to-be-downloaded file is less than or equal to a third preset threshold, the processor 20 being configured to respectively allocate a first download range and a second download range to the first network interface card and the second network interface card according to the download range of the to-be-downloaded data is dividing the to-be-downloaded file into a first part and a second part according to a current network speed ratio between the first network interface card and the second network interface card, obtaining, through division, the first download range in the download range of the to-be-downloaded data according to a value obtained after a size of the first speed testing download range is deducted from the first part, and obtaining, through division, the second download range in the download range of the to-be-downloaded data according to a value obtained after a size of the second speed testing download range is deducted from the second part; or dividing the download range of the to-be-downloaded data into the first download range and the second download range according to a current network speed ratio between the first network interface card and the second network interface card.

For a large file, that is, if the to-be-downloaded file is greater than the third preset threshold, the processor 20 being configured to respectively allocate a first download range and a second download range to the first network interface card and the second network interface card according to the download range of the to-be-downloaded data is obtaining, through division, a first to-be-downloaded part from the download range of the to-be-downloaded data, where a size of the first to-be-downloaded part is equal to a fourth preset threshold; and dividing the first to-be-downloaded part into a first download subrange and a second download subrange according to a current network speed ratio between the first network interface card and the second network interface card, and using a remaining part of the download range of the to-be-downloaded data except the first to-be-downloaded part as a new download range of the to-be-downloaded data, where the first download subrange belongs to the first download range, and the second download subrange belongs to the second download range; until a size of the new download range of the to-be-downloaded data is less than or equal to the fourth preset threshold; and further, dividing the new download range of the to-be-downloaded data that is less than or equal to the third threshold into a new first download subrange and a new second download subrange according to the current network speed ratio between the first network interface card and the second network interface card, where the new first download subrange belongs to the first download range, and the new second download subrange belongs to the second download range.

In another embodiment, in a large-file allocation process, the first network interface card and the second network interface card may share download tasks with each other. After the processor 20 uses the remaining part of the download range of the to-be-downloaded data except the first to-be-downloaded part as the new download range of the to-be-downloaded data, if the second network interface card does not complete downloading of the second download subrange when the first network interface card completes downloading of the first download subrange, and a remaining download range of the second download subrange is less than or equal to a fifth preset threshold, the processor 20 is further configured to obtain, through division, a second to-be-downloaded part from the new download range of the to-be-downloaded data, where a size of the second to-be-downloaded part is equal to the fourth preset threshold; divide the first to-be-downloaded part into a third download subrange and a fourth download subrange according to the current network speed ratio between the first network interface card and the second network interface card, where the third download subrange belongs to the first download range, and the fourth download subrange belongs to the second download range; and if the second network interface card does not complete the second download subrange when the first network interface card completes the first download subrange and completes the third download subrange, allocate the fourth download subrange to the first network interface card for downloading.

Based on the foregoing embodiment, the processor 20 being configured to respectively allocate the new first download range and the new second download range to the first network interface card and the second network interface card according to the remaining download range of the second download range is dividing the remaining download range of the second download range into a buffer range and a to-be-allocated range; and respectively allocating the new first download range and the new second download range to the first network interface card and the second network interface card according to the to-be-allocated range.

The processor 20 being configured to respectively allocate the new first download range and the new second download range to the first network interface card and the second network interface card according to the to-be-allocated range is dividing the to-be-allocated range into a first to-be-allocated subrange and a second to-be-allocated subrange according to a current network speed ratio between the first network interface card and the second network interface card, using the first to-be-allocated subrange as the new first download range, and using a sum of a downloaded range of the second network interface card, the buffer range, and the second to-be-allocated subrange in the second download range as the new second download range; or using the first to-be-allocated subrange as the new first download range, and using a sum of the buffer range and the second to-be-allocated subrange as the new second download range.

The processor 20 being configured to respectively allocate the new first speed testing download range and the new second speed testing download range to the first network interface card and the second network interface card according to the remaining download range of the second speed testing download range is dividing the remaining download range of the second speed testing download range into a first speed testing download subrange and a second speed testing download subrange according to a current network speed ratio between the first network interface card and the second network interface card, using the first speed testing download subrange as the new first speed testing download range, and using a sum of the second speed testing download range that is downloaded by the second network interface card and the second speed testing download subrange as the new second speed testing download range, or using the new second speed testing download range as a new second speed testing download range.

The terminal provided in this embodiment of the present disclosure can perform the foregoing method embodiments, and the implementation principles and technical effects thereof are similar. Details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method applicable to a terminal comprising a first network interface card and a second network interface card, the method comprising:
   dividing, by the terminal, a to-be-downloaded file into a first speed testing download range, a second speed testing download range, and a download range of to-be-downloaded data;
   allocating, by the terminal, the first speed testing download range to the first network interface card for downloading;
   allocating the second speed testing download range to the second network interface card for downloading;
   obtaining, by the terminal, a first current network speed of the first network interface card based on the downloading of the first speed testing download range by the first network interface card;
   obtaining, by the terminal, a second current network speed of the second network interface card based on the downloading of the second speed testing download range by the second network interface card;
   obtaining, by the terminal, the download range of the to-be-downloaded data;
   allocating, by the terminal, a first download range to the first network interface card based on the download range of the to-be-downloaded data;
   allocating, by the terminal, a second download range to the second network interface card based on the download range of the to-be-downloaded data; and
   performing, by the terminal, a first allocation operation until the second download range is completely downloaded when the second network interface card does not complete downloading of the second download range at the time the first network interface card completes downloading of the first download range, and when a remaining download range of the second download range is greater than a first preset threshold,
   wherein the first allocation operation comprises:
      allocating a new first download range to the first network interface card based on the remaining download range of the second download range; and
      allocating a new second download range to the second network interface card based on the remaining download range of the second download range.

2. The method of claim 1, wherein before performing the first allocation operation, the method further comprises:
   determining, by the terminal, whether there is an undownloaded range in the download range of the to-be-downloaded data except the first download range and the second download range;
   using a first value as the first preset threshold when there is the undownloaded range in the download range of the to-be-downloaded data except the first download range and the second download range; and
   using a second value as the first preset threshold when there is not the undownloaded range in the download range of the to-be-downloaded data except the first download range and the second download range, wherein the first value is greater than the second value.

3. The method of claim 1, wherein after allocating the first speed testing download range and the second speed testing download range, the method further comprises:
   performing, by the terminal, a second allocation operation until the second speed testing download range is completely downloaded when the second network interface card does not complete the second speed testing download range at the time the first network interface card completes the first speed testing download range, and when a remaining download range of the second speed testing download range that is not completed by the second network interface card is greater than a second preset threshold,
   wherein the second allocation operation comprises:
      allocating a new first speed testing download range to the first network interface card based on the remaining download range of the second speed testing download range; and allocating a new second speed testing download range to the second network interface card based on the remaining download range of the second speed testing download range.

4. The method of claim 1, wherein after allocating the first speed testing download range and the second speed testing download range, the method further comprises allocating, by the terminal, when the first network interface card completes the first download range and the second network interface card does not complete the second speed testing download range, the second download range to the first network interface card for downloading when the second network interface card does not complete the second speed testing download range at the time the first network interface card completes the first speed testing download range and begins to download the first download range, and when a remaining download range of the second speed testing download range that is not completed by the second network interface card is less than or equal to a second preset threshold.

5. The method of claim 1, wherein when the to-be-downloaded file is less than or equal to a third preset threshold, allocating the first download range and the second download range comprises:
dividing, by the terminal, the to-be-downloaded file into a first part and a second part based on a current network speed ratio between the first network interface card and the second network interface card;
obtaining, through division, the first download range in the download range of the to-be-downloaded data based on a first value obtained after a first size of the first speed testing download range is deducted from the first part;
obtaining, through division, the second download range in the download range of the to-be-downloaded data based on a second value obtained after a second size of the second speed testing download range is deducted from the second part; or
dividing, by the terminal, the download range of the to-be-downloaded data into the first download range and the second download range based on a current network speed ratio between the first network interface card and the second network interface card.

6. The method of claim 1, wherein when the to-be-downloaded file is greater than a third preset threshold, allocating the first download range and the second download range comprises:
A. obtaining, by the terminal through division, a first to-be-downloaded part from the download range of the to-be-downloaded data, wherein a size of the first to-be-downloaded part is equal to a fourth preset threshold;
B. dividing, by the terminal, the first to-be-downloaded part into a first download subrange and a second download subrange based on a current network speed ratio between the first network interface card and the second network interface card, and using a remaining part of the download range of the to-be-downloaded data as a new download range of the to-be-downloaded data, wherein the first download subrange belongs to the first download range, and wherein the second download subrange belongs to the second download range;
circularly performing A and B until a size of the new download range of the to-be-downloaded data is less than or equal to the fourth preset threshold; and
dividing, by the terminal, the new download range of the to-be-downloaded data into a new first download subrange and a new second download subrange based on the current network speed ratio between the first network interface card and the second network interface card, wherein the new first download subrange belongs to the first download range, and wherein the new second download subrange belongs to the second download range.

7. The method of claim 1, wherein allocating the new first download range and the new second download range comprises:
dividing, by the terminal, the remaining download range of the second download range into a buffer range and a to-be-allocated range;
allocating, by the terminal, the new first download range to the first network interface card based on the to-be-allocated range; and
allocating, by the terminal, the new second download range to the second network interface card based on the to-be-allocated range.

8. The method of claim 7, wherein allocating the new first download range and the new second download range comprises:
dividing, by the terminal, the to-be-allocated range into a first to-be-allocated subrange and a second to-be-allocated subrange based on a current network speed ratio between the first network interface card and the second network interface card;
using the first to-be-allocated subrange as the new first download range, and using a sum of a downloaded range of the second network interface card, the buffer range, and the second to-be-allocated subrange in the second download range as the new second download range; or
using the first to-be-allocated subrange as the new first download range, and using a sum of the buffer range and the second to-be-allocated subrange as the new second download range.

9. The method of claim 1, wherein performing the first allocation operation comprises:
determining, by the terminal, whether a part, whose current download speed is greater than a current download speed of the second network interface card, of the first network interface card meets a preset condition when the second network interface card does not complete the downloading of the second download range when the first network interface card completes the downloading of the first download range, wherein there is no undownloaded range in the download range of the to-be-downloaded data except the first download range and the second download range, and wherein the remaining download range of the second download range is greater than the first preset threshold; and
performing, by the terminal, the first allocation operation when the part meets the preset condition.

10. A terminal, comprising:
a first network interface card;
a second network interface card;
a non-transitory memory storage comprising instructions; and
one or more processors in communication with the first network interface card, the second network interface card and the memory storage, wherein the one or more processors execute the instructions to:
divide a to-be-downloaded file into a first speed testing download range, a second speed testing download range, and a download range of to-be-downloaded data;

allocate the first speed testing download range to the first network interface card for downloading;

allocate the second speed testing download range to the second network interface card for downloading;

obtain a first current network speed of the first network interface card based on the downloading of the first speed testing download range by the first network interface card;

obtain a second current network speed of the second network interface card based on the downloading of the second speed testing download range by the second network interface card;

obtain the download range of the to-be-downloaded data;

allocate a first download range to the first network interface card based on the download range of the to-be-downloaded data;

allocate a second download range to the second network interface card based on the download range of the to-be-downloaded data; and perform a first allocation operation until the second download range is completely downloaded when the second network interface card does not complete downloading of the second download range at the time the first network interface card completes downloading of the first download range, and when a remaining download range of the second download range is greater than a first preset threshold, wherein the first allocation operation comprises:
 allocate a new first download range to the first network interface card based on the remaining download range of the second download range; and
 allocate a new second download range to the second network interface card based on the remaining download range of the second download range.

11. The terminal of claim 10, wherein the one or more processors further execute the instructions to:
 determine whether there is an undownloaded range in the download range of the to-be-downloaded data except the first download range and the second download range;
 use a first value as the first preset threshold when there is the undownloaded range in the download range of the to-be-downloaded data except the first download range and the second download range; and
 use a second value as the first preset threshold when there is not the undownloaded range in the download range of the to-be-downloaded data except the first download range and the second download range, wherein the first value is greater than the second value.

12. The terminal according to claim 10, wherein the one or more processors further execute the instructions to:
 perform a second allocation operation until the second speed testing download range is completely downloaded when the second network interface card does not complete the second speed testing download range at the time the first network interface card completes the first speed testing download range, and when a remaining download range of the second speed testing download range that is not completed by the second network interface card is greater than a second preset threshold,
 wherein the second allocation operation comprises:
  allocate a new first speed testing download range to the first network interface card based on the remaining download range of the second speed testing download range; and
  allocate a new second speed testing download range to the second network interface card based on the remaining download range of the second speed testing download range.

13. The terminal according to claim 10, wherein the one or more processors further execute the instructions to allocate when the first network interface card completes the first download range and the second network interface card does not complete the second speed testing download range, the second download range to the first network interface card for downloading when the second network interface card does not complete the second speed testing download range when the first network interface card completes the first speed testing download range and begins to download the first download range, and when a remaining download range of the second speed testing download range that is not completed by the second network interface card is less than or equal to a second preset threshold.

14. The terminal of claim 10, wherein when the to-be-downloaded file is less than or equal to a third preset threshold, the one or more processors further execute the instructions to:
 divide the to-be-downloaded file into a first part and a second part based on a current network speed ratio between the first network interface card and the second network interface card;
 obtain, through division, the first download range in the download range of the to-be-downloaded data based on a first value obtained after a first size of the first speed testing download range is deducted from the first part;
 obtain, through division, the second download range in the download range of the to-be-downloaded data based on a second value obtained after a second size of the second speed testing download range is deducted from the second part; or
 divide the download range of the to-be-downloaded data into the first download range and the second download range based on a current network speed ratio between the first network interface card and the second network interface card.

15. The terminal according to claim 10, wherein when the to-be-downloaded file is greater than a third preset threshold, the one or more processors further execute the instructions to:
 A. obtain, by the terminal through division, a first to-be-downloaded part from the download range of the to-be-downloaded data, wherein a size of the first to-be-downloaded part is equal to a fourth preset threshold;
 B. divide the first to-be-downloaded part into a first download subrange and a second download subrange based on a current network speed ratio between the first network interface card and the second network interface card, and using a remaining part of the download range of the to-be-downloaded data as a new download range of the to-be-downloaded data, wherein the first download subrange belongs to the first download range, and wherein the second download subrange belongs to the second download range;
 circularly perform A and B until a size of the new download range of the to-be-downloaded data is less than or equal to the fourth preset threshold; and
 divide the new download range of the to-be-downloaded data into a new first download subrange and a new second download subrange based on the current network speed ratio between the first network interface card and the second network interface card, wherein the new first download subrange belongs to the first download range, and wherein the new second download subrange belongs to the second download range.

16. The terminal of claim 10, wherein the one or more processors further execute the instructions to:

divide the remaining download range of the second download range into a buffer range and a to-be-allocated range;

allocate the new first download range to the first network interface card based on the to-be-allocated range; and allocate the new second download range to the second network interface card based on the to-be-allocated range.

17. The terminal according to claim 16, wherein the one or more processors further execute the instructions to:

divide the to-be-allocated range into a first to-be-allocated subrange and a second to-be-allocated subrange based on a current network speed ratio between the first network interface card and the second network interface card;

use the first to-be-allocated subrange as the new first download range, and use a sum of a downloaded range of the second network interface card, the buffer range, and the second to-be-allocated subrange in the second download range as the new second download range; or use the first to-be-allocated subrange as the new first download range, and use a sum of the buffer range and the second to-be-allocated subrange as the new second download range.

18. The terminal according to claim 10, wherein when the second network interface card does not complete downloading of the second download range when the first network interface card completes downloading of the first download range, and when the remaining download range of the second download range is greater than the first preset threshold the one or more processors further execute the instructions to:

determine whether a part, whose current download speed is greater than a current download speed of the second network interface card, of the first network interface card meets a preset condition when the second network interface card does not complete the downloading of the second download range when the first network interface card completes the downloading of the first download range, wherein there is no undownloaded range in the download range of the to-be-downloaded data except the first download range and the second download range, and wherein the remaining download range of the second download range is greater than the first preset threshold; and perform the first allocation operation when the part meets the preset condition.

* * * * *

UNITED STATES PATENT AND TRADEMARK OFFICE
CERTIFICATE OF CORRECTION

PATENT NO. : 10,506,020 B2
APPLICATION NO. : 15/728108
DATED : December 10, 2019
INVENTOR(S) : Hui Jin, Songping Yao and Zhen Wu It is certified that error appears in the above-identified patent and that said Letters Patent is hereby corrected as shown below:

On the Title Page

Page 2, Other Publications, 2nd Column, Line 30: "Application, Japanese" should read "Application, Korean"

Page 2, Other Publications, 2nd Column, Line 33: "Application, Japanese" should read "Application, Korean"

Signed and Sealed this
Fourth Day of February, 2020

Andrei Iancu
*Director of the United States Patent and Trademark Office*